United States Patent
Otani

(10) Patent No.: US 10,824,212 B2
(45) Date of Patent: Nov. 3, 2020

(54) POWER FEEDING SYSTEM AND NEGOTIATION CONTROLLER

(71) Applicant: Renesas Electronics Corporation, Tokyo (JP)

(72) Inventor: Satoshi Otani, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 18 days.

(21) Appl. No.: 15/654,496

(22) Filed: Jul. 19, 2017

(65) Prior Publication Data

US 2018/0088648 A1 Mar. 29, 2018

(30) Foreign Application Priority Data

Sep. 27, 2016 (JP) .................................. 2016-188173

(51) Int. Cl.
*G06F 1/26* (2006.01)
*H02J 7/00* (2006.01)
(Continued)

(52) U.S. Cl.
CPC ............ *G06F 1/266* (2013.01); *G06F 13/387* (2013.01); *G06F 13/4282* (2013.01); *H02J 1/04* (2013.01);
(Continued)

(58) Field of Classification Search
None
See application file for complete search history.

(56) References Cited

U.S. PATENT DOCUMENTS 6,211,649 B1   4/2001  Matsuda
6,847,718 B1*  1/2005  Hiraoka .................. H04L 12/10
                                                   379/413
(Continued)

FOREIGN PATENT DOCUMENTS

JP   2000-339067 A   12/2000
JP   2006-293565 A   10/2006
(Continued)

OTHER PUBLICATIONS

Japanese Notice of Reasons for Refusal issued in corresponding Japanese Patent Application No. 2016-188173, dated May 19, 2020, with English translation.

(Continued)

*Primary Examiner* — Jue Zhang
*Assistant Examiner* — Henry E Lee, III
(74) *Attorney, Agent, or Firm* — McDermott Will & Emery LLP

(57) ABSTRACT

A power feeding system according to one embodiment includes a negotiation controller included in a power receiving device, a negotiation controller included in a power feeding device, and a determination unit that determines whether to allow power feeding from the power feeding device to the power receiving device. The negotiation controller in the power receiving device includes an information acquisition unit that acquires information to be used for the determination regarding whether to allow the power feeding. The determination unit determines, using the information acquired in the information acquisition unit, whether to allow the power feeding from the power feeding device. The negotiation controller in the power feeding device controls the power supply to the power receiving device in accordance with the result of the determination in the determi- (Continued)

nation unit. The determination unit is provided in at least one of the power feeding device and the power receiving device.

16 Claims, 14 Drawing Sheets

(51) Int. Cl.
    *G06F 13/38*     (2006.01)
    *G06F 13/42*     (2006.01)
    *H02J 1/04*     (2006.01)
    *H04L 12/10*     (2006.01)
    *H04L 29/06*     (2006.01)
    *H02J 1/08*     (2006.01)

(52) U.S. Cl.
    CPC ................ *H02J 7/00* (2013.01); *H04L 12/10* (2013.01); *H04L 69/08* (2013.01); *G06F 2213/0042* (2013.01); *H02J 1/082* (2020.01)

(56) References Cited

U.S. PATENT DOCUMENTS 9,584,016 B2    2/2017    Motoki

2015/0249354 A1*    9/2015    Lim ...................... H02J 7/0052
    307/1
2016/0006190 A1    1/2016    Katsuura et al.
2016/0352117 A1    12/2016    Zhang

FOREIGN PATENT DOCUMENTS

| | | |
|---|---|---|
| JP | 2012-177989 A | 9/2012 |
| JP | 2012-255747 A | 12/2012 |
| JP | 2013-090395 A | 5/2013 |
| JP | 2015-176443 A | 10/2015 |
| JP | 2016-086527 A | 5/2016 |
| WO | 2015/059863 A1 | 4/2015 |
| WO | 2015/113465 A1 | 8/2015 |

OTHER PUBLICATIONS

Japanese Notice of Reasons for Refusal issued in corresponding Japanese Patent Application No. 2016-188173, dated Dec. 10, 2019, with English translation.

* cited by examiner

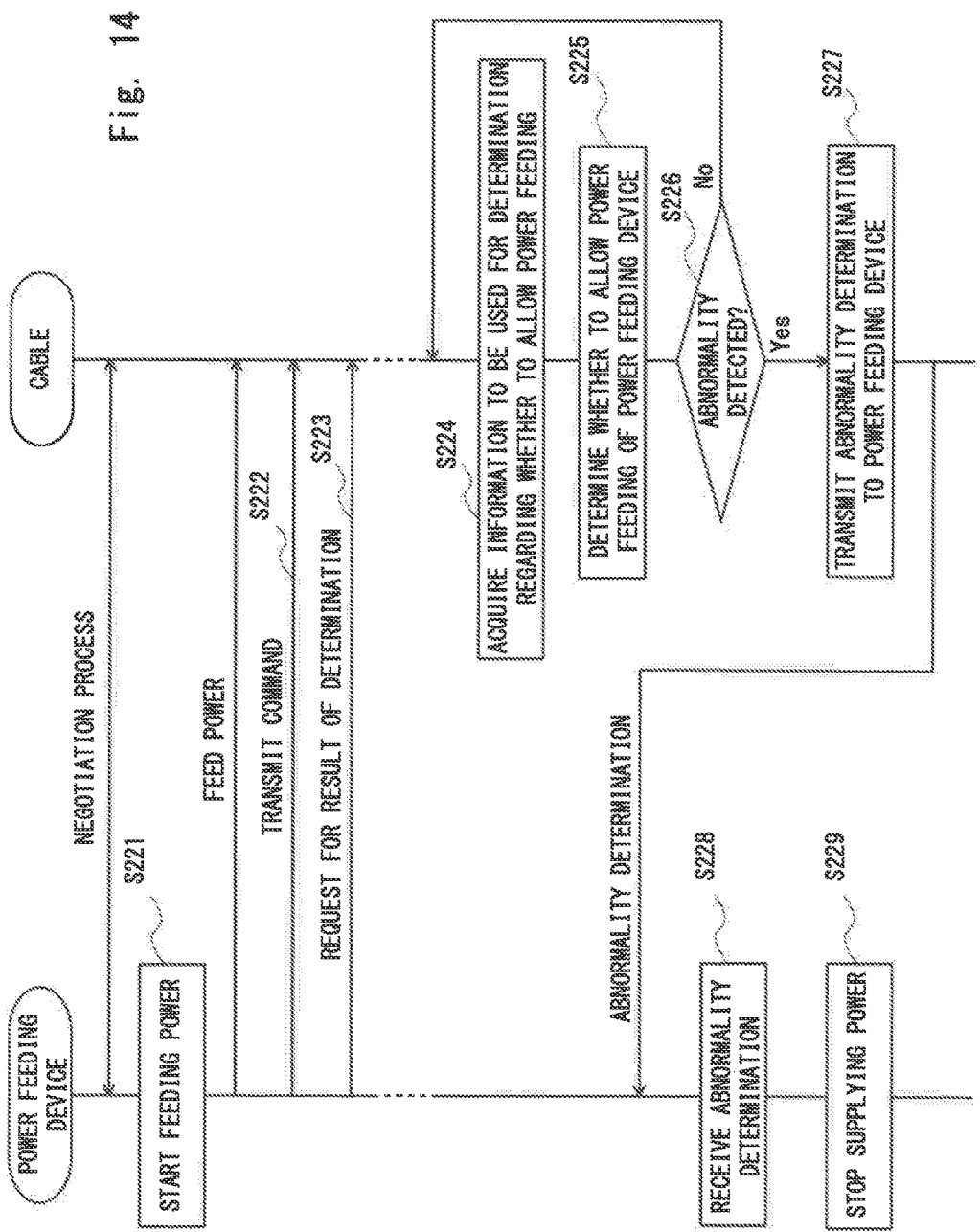

POWER FEEDING SYSTEM AND NEGOTIATION CONTROLLER

CROSS-REFERENCE TO RELATED APPLICATIONS

This application is based upon and claims the benefit of priority from Japanese patent application No. 2016-188173, filed on Sep. 27, 2016, the disclosure of which is incorporated herein in its entirety by reference.

BACKGROUND

The present invention relates to a power feeding system and a negotiation controller, and relates to, for example, a power feeding system that supplies power from a power feeding device to a power receiving device via a cable and a negotiation controller.

Techniques for performing power feeding between devices using a communication cable have become widespread. For example, Universal Serial Bus (USB) is one of standards for connecting a peripheral device to an information device such as a computer. With the use of the USB, besides communication between the devices, power feeding can also be performed.

Japanese Unexamined Patent Application Publication No. 2012-177989 discloses a technique related to a power receiving device capable of quickly detecting faulty power feeding when power feeding for a power receiving device is executed.

SUMMARY

In the technique disclosed in Japanese Unexamined Patent Application Publication No. 2012-177989, when power is fed from a power feeding device to a power receiving device via a cable, it is determined in the power receiving device whether a state of the power feeding is good. When it is determined that the state of the power feeding is poor, a switch provided in the power receiving device is turned off and the power feeding from the power feeding device is stopped.

In the technique disclosed in Japanese Unexamined Patent Application Publication No. 2012-177989, however, only the power receiving device stops power feeding while the power feeding device continues feeding power to the power receiving device. Accordingly, if, for example, there is a fault in the cable connected to the power feeding device, since the power feeding device continues feeding power, the faulty area of the cable may be heated or shorted out. Accordingly, in such a power feeding system, there is a problem that security performance is not sufficiently high.

The other problems of the related art and the novel characteristics of the present invention will be made apparent from the descriptions of the specification and the accompanying drawings.

A power feeding system according to one embodiment includes: a first negotiation controller included in a power receiving device or a cable; a second negotiation controller included in a power feeding device; and a determination unit configured to determine whether to allow power feeding from the power feeding device to the power receiving device. The first negotiation controller includes an information acquisition unit configured to acquire information to be used for the determination regarding whether to allow the power feeding. The determination unit determines, using the information acquired in the information acquisition unit, whether to allow the power feeding from the power feeding device. The second negotiation controller controls the power supply to the power receiving device in accordance with the result of the determination in the determination unit.

According to the embodiment, it is possible to provide the power feeding system and the negotiation controller capable of improving the security performance.

BRIEF DESCRIPTION OF THE DRAWINGS

The above and other aspects, advantages and features will be more apparent from the following description of certain embodiments taken in conjunction with the accompanying drawings, in which:

FIG. 14 is a flowchart showing another example of the operations of the power feeding system according to the seventh embodiment.

DETAILED DESCRIPTION

A power feeding system according to an embodiment includes: a first negotiation controller included in a power receiving device or a cable a second negotiation controller included in a power feeding device; and a determination unit configured to determine whether to allow power feeding from the power feeding device to the power receiving device. The first negotiation controller includes an information acquisition unit configured to acquire information to be used for the determination regarding whether to allow the power feeding. The determination unit determines, using the information acquired in the information acquisition unit, whether to allow the power feeding from the power feeding device. The second negotiation controller controls the power supply to the power receiving device in accordance with the result of the determination in the determination unit.

In first to sixth embodiments described below, a configuration in which a power receiving device includes a first negotiation controller will be described. Further, in a seventh embodiment, a configuration in which a cable includes a first negotiation controller will be described.

First Embodiment

Hereinafter, with reference to the drawings, embodiments will be described.

Figure 1:
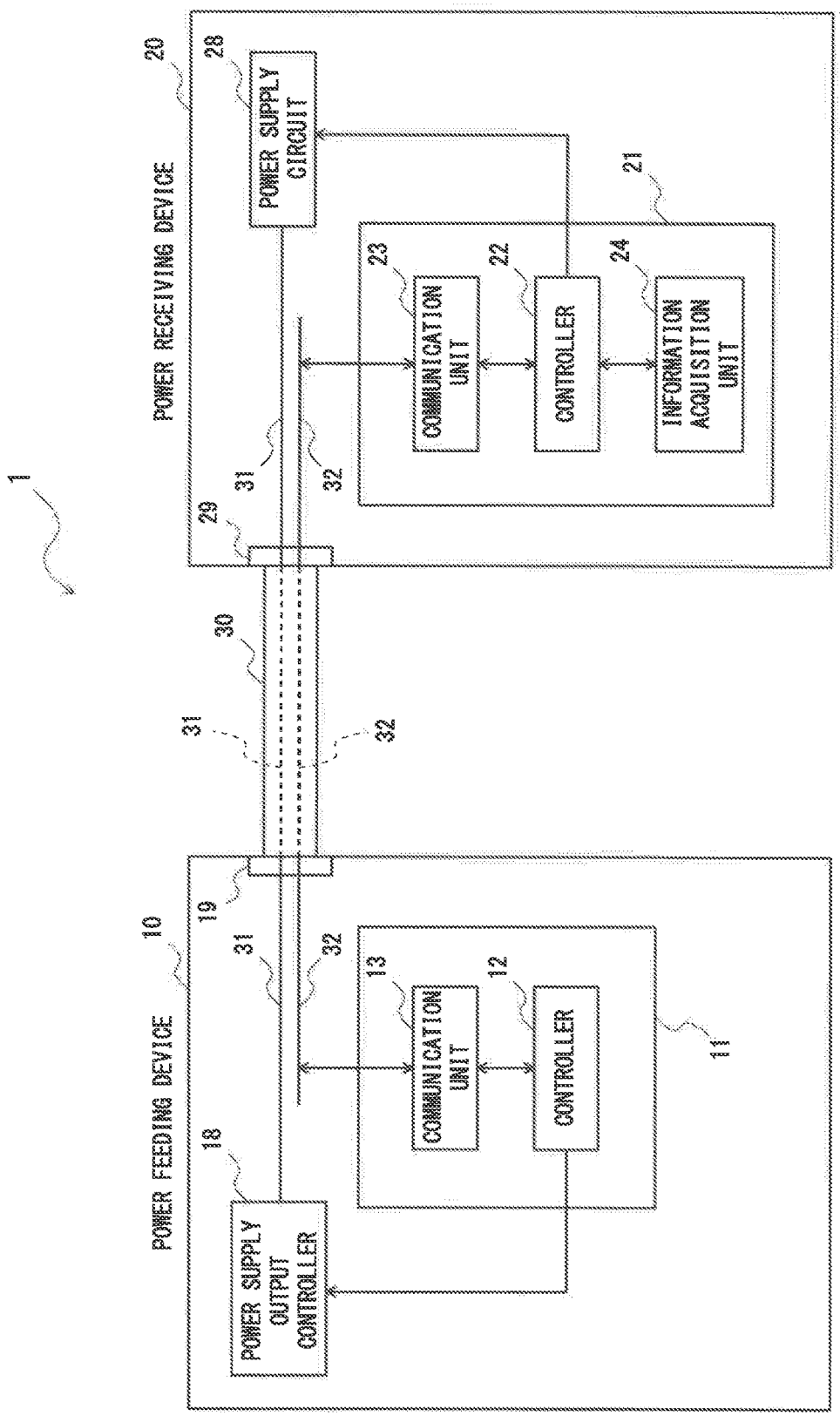
FIG. 1 is a block diagram showing a power feeding system according to a first embodiment.

FIG. 1 is a block diagram showing a power feeding system according to a first embodiment. As shown in FIG. 1, a power feeding system 1 according to this embodiment includes a power feeding device 10 and a power receiving device 20. The power feeding device 10 includes a negotiation controller 11, a power supply output controller 18, and a connector 19. The negotiation controller 11 includes a controller 12 and a communication unit 13. The power receiving device 20 includes a negotiation controller 21, a power supply circuit 28, and a connector 29. The negotiation controller 21 includes a controller 22, a communication unit 23, and an information acquisition unit 24.

The power feeding device 10 and the power receiving device 20 are connected to each other via a cable 30. The cable 30 includes a power supply line 31 and a communication line 32. The power feeding device 10 is configured to be able to supply power to the power receiving device 20 via the power supply line 31. The power feeding device 10 and the power receiving device 20 are configured to be able to communicate with each other via the communication line 32.

The power feeding device 10 and the power receiving device 20 are embedded in, for example, an information device such as a computer or a peripheral device and the power feeding device 10 and the power receiving device 20 are connected to each other via the cable 30, whereby the information communication and the power supply between the devices can be concurrently performed. The information communication between the devices is performed using the communication line 32 included in the cable 30 and the power supply between the devices is performed using the power supply line 31 included in the cable 30.

The power feeding device 10 and the power receiving device 20 are, for example, devices that are equipped with USB terminals. In this case, the connector 19 and the connector 29 are USB connectors and the cable 30 is a USB cable. USB Power Delivery standards define, for example, that power between 5 V-20 V (up to 100 W) can be supplied. Further, the power feeding device 10 may be an AC adapter.

The negotiation controller 11 included in the power feeding device 10 includes the controller 12 and the communication unit 13. The communication unit 13 is configured to be able to communicate with the negotiation controller 21 included in the power receiving device 20 via the communication line 32. The controller 12 communicates with the negotiation controller 21 included in the power receiving device 20 and determines the power (voltage) to be supplied to the power receiving device 20. The controller 12 determines, for example, based on the power (voltage) requested from the negotiation controller 21 included in the power receiving device 20, the power (voltage) to be supplied to the power receiving device 20. Further, the controller 12 outputs a control signal for controlling the power that the power feeding device 10 supplies to the power receiving device 20 to the power supply output controller 18.

The power supply output controller 18 controls, in accordance with the control signal output from the controller 12, the power that the power feeding device 10 supplies to the power receiving device 20. The power supply output controller 18 includes, for example, a power supply circuit (not shown) and changes, in accordance with the control signal output from the controller 12, the voltage supplied from the power supply circuit (not shown) to supply the resulting voltage to the power supply line 31. According to the aforementioned configuration, the power supply output controller 18 is able to supply power of a different voltage to the power supply line 31. Further, when the control signal output from the controller 12 is a control signal for instructing stop of the power feeding, the power supply output controller 18 stops the power supply to the power supply line 31.

The negotiation controller 21 included in the power receiving device 20 includes the controller 22, the communication unit 23, and the information acquisition unit 24. The communication unit 23 is configured to be able to communicate with the negotiation controller 11 included in the power feeding device 10 via the communication line 32. The controller 22 communicates with the negotiation controller 11 included in the power feeding device 10 and determines the power (voltage) to be received from the power feeding device 10. Further, the controller 22 outputs a control signal for controlling the power supply circuit 28 to the power supply circuit 28.

The information acquisition unit 24 acquires information to be used for a determination regarding whether to allow the power feeding by the power feeding device 10. The information to be used for the determination regarding whether to allow the power feeding includes, for example, the voltage value of the power supply line 31 measured in the power receiving device 20, the number of times of insertion and removal of the cable 30 to and from the connector 29 included in the power receiving device 20, the temperature at a predetermined location on the power receiving device 20 and the like. The information acquisition unit 24 may acquire the information to be used for the determination regarding whether to allow the power feeding from, for example, a sensor provided outside the negotiation controller 21. These are merely examples and the power feeding system 1 according to this embodiment may use other information as the information to be used for the determination regarding whether to allow the power feeding.

When, for example, the voltage value of the power supply line 31 of the power receiving device 20 is used as the information to be used for the determination regarding whether to allow the power feeding, the voltage of the power supply line 31 is measured in the information acquisition unit 24 or the power supply circuit 28. Note that this configuration will be described in detail in fourth to six embodiments.

Further, when the number of times of insertion and removal of the cable 30 to and from the connector 29 included in the power receiving device 20 is used as the information to be used for the determination regarding whether to allow the power feeding, the negotiation controller 21 detects the insertion and the removal of the cable 30 and the number of times of insertion and removal of the cable is counted.

Further, when the temperature at the predetermined location on the power receiving device 20 is used as the information to be used for the determination regarding whether to allow the power feeding, a temperature sensor is provided at a predetermined location on the power receiving device 20 and the temperature is measured using this temperature sensor. The temperature sensor is preferably provided, for example, in the vicinity of the connector 29 or in the vicinity of the power supply line 31 of the power receiving device 20. By providing the temperature sensor in the vicinity of the connector 29, a temperature increase due to a faulty connection between the cable 30 and the connector 29 or a temperature increase due to a faulty connection of the cable can be detected. Further, by providing the temperature sensor in the vicinity of the power supply line 31 of the power receiving device 20, it is possible to detect a temperature increase due to a failure in the power supply line 31 or a temperature increase due to overvoltage supply.

The power supply circuit 28 controls the state of the power feeding from the power feeding device 10 in accordance with the control signal output from the controller 22. For example, an internal circuit (not shown) is connected to the output stage of the power supply circuit 28 and the power supply circuit 28 controls the supply of the power to the internal circuit in accordance with the control signal output from the controller 22. When, for example, the control signal output from the controller 22 is the control signal indicating that the supply of the power to the internal circuit should be interrupted, the power supply circuit 28 cuts the connection between the power supply line 31 and the internal circuit.

Next, operations of the power feeding system 1 according to this embodiment will be described.

Figure 2:
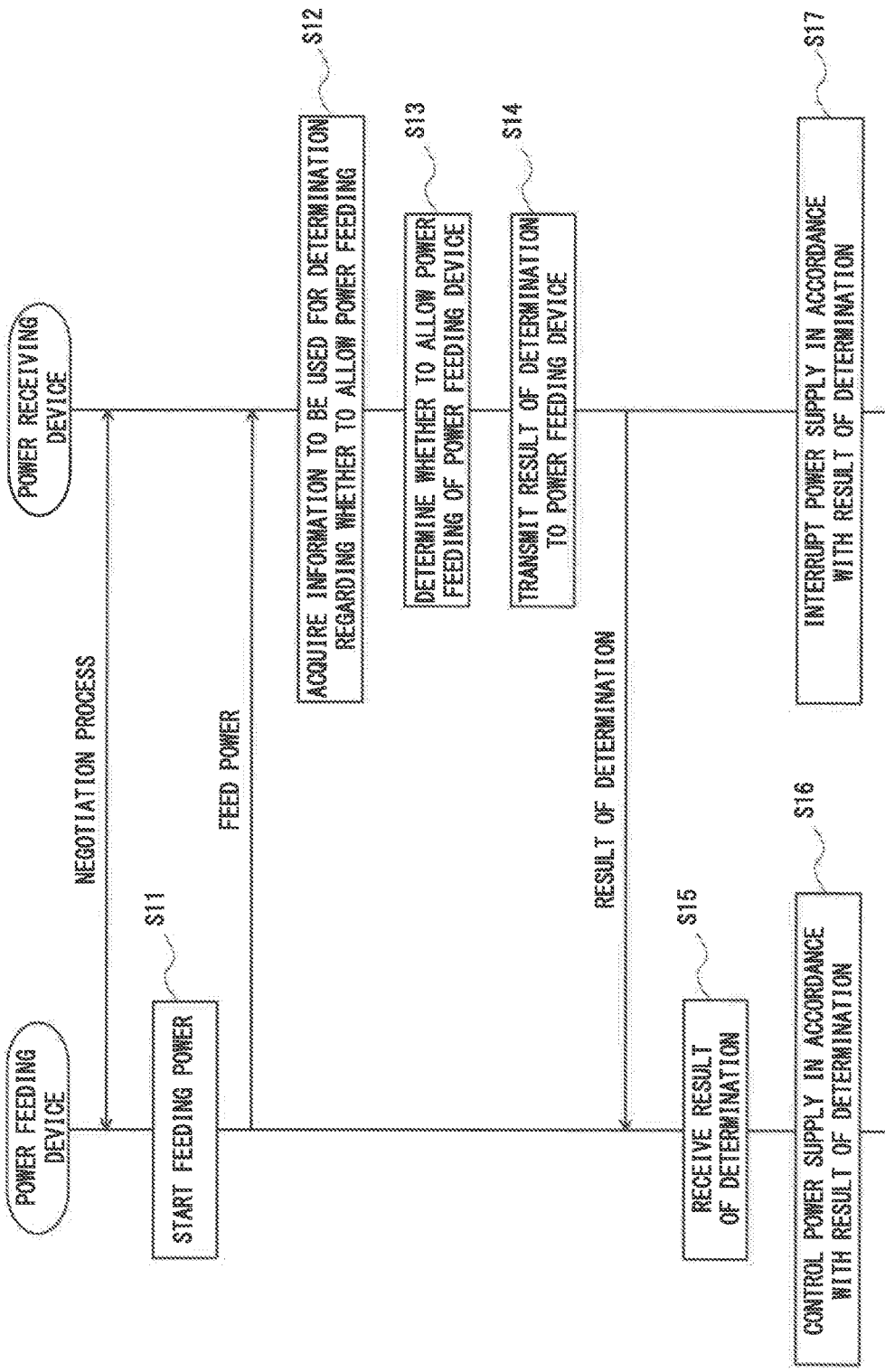
FIG. 2 is a flowchart showing operations of the power feeding system according to the first embodiment.

FIG. 2 is a flowchart showing operations of the power feeding system according to this embodiment. In the power feeding system 1 according to this embodiment, the power feeding operation is started when the power feeding device 10 and the power receiving device 20 are connected to each other via the cable 30. When the power feeding operation is started, the power feeding device 10 and the power receiving device 20 communicate with each other to execute the operation of determining the power (voltage) that the power feeding device 10 supplies to the power receiving device 20 (negotiation process).

Specifically, the negotiation controller 21 included in the power receiving device 20 transmits information indicating the power that the power receiving device 20 requires to the negotiation controller 11 included in the power feeding device 10. Further, the negotiation controller 11 included in the power feeding device 10 transmits information regarding the power that the power feeding device 10 is able to supply to the negotiation controller 21 included in the power receiving device 20. When the power receiving device 20 and the power feeding device 10 have agreed on the power to be supplied, the negotiation process is ended. On the other hand, when the power receiving device 20 and the power feeding device 10 have not agreed on the power to be supplied, the negotiation controller 21 included in the power receiving device 20 transmits information indicating power lower than the power that it has presented last time to the negotiation controller 11 included in the power feeding device 10. This operation is repeated until the power receiving device 20 and the power feeding device 10 agree on the power to be supplied. According to this process, the power (voltage) that the power feeding device 10 supplies to the power receiving device 20 is determined.

After the negotiation process described above is completed, the power feeding device 10 starts feeding power to the power receiving device 20 (Step S11). Specifically, the controller 12 of the power feeding device 10 outputs the control signal for supplying the power (voltage) to be supplied determined in the negotiation process described above to the power supply output controller 18. The power supply output controller 18 supplies the power in accordance with the control signal output from the controller 12 to the power receiving device 20 via the power supply line 31.

Next, the information acquisition unit 24 of the power receiving device 20 acquires information to be used for the determination regarding whether to allow the power feeding from the power feeding device 10 (Step S12). The acquired information is supplied to the controller 22. The information to be used for the determination regarding whether to allow the power feeding includes, for example, the voltage value of the power supply line 31 measured in the power receiving device 20 (the details thereof will be described in the fourth to sixth embodiments), the number of times of insertion and removal of the cable 30 to and from the connector 29 included in the power receiving device 20, the temperature at the predetermined location on the power receiving device 20 and the like. These are merely examples and the power feeding system 1 according to this embodiment may use other information as the information to be used for the determination regarding whether to allow the power feeding.

Next, the controller 22 of the power receiving device 20 determines, using the information to be used for the determination regarding whether to allow the power feeding by the power feeding device 10, whether to allow the power feeding by the power feeding device 10 (Step S13). In this case, the controller 22 of the power receiving device 20 serves as a determination unit.

When, for example, the information to be used for the determination regarding whether to allow the power feeding is the voltage value of the power supply line 31 measured in the power receiving device 20, the controller 22 determines that the power feeding by the power feeding device 10 should be rejected in a case in which the difference between the voltage value that the power feeding device 10 supplies to the power receiving device 20 and the voltage value of the power supply line 31 measured in the power receiving device 20 is equal to or larger than a predetermined value. In this case, it can be considered that the voltage value on the side of the power receiving device 20 has been reduced due to a failure (e.g., a damage) in the cable 30. The voltage value that the power feeding device 10 supplies to the power receiving device 20 has already been acquired by the controller 22 in the negotiation process.

Further, when, for example, the information to be used for the determination regarding whether to allow the power feeding is the number of times of insertion and removal of the cable 30 to and from the connector 29 included in the power receiving device 20, the controller 22 determines that the power feeding by the power feeding device 10 should be rejected in a case in which the number of times of insertion and removal is equal to or larger than a predetermined value. When the number of times of insertion and removal of the cable 30 to and from the connector 29 is equal to or larger than a predetermined value, there is a possibility that a failure (e.g., a damage) may occur in the connector 29 or the cable 30. In this case, the controller 22 determines that the power feeding by the power feeding device 10 should be rejected.

Further, when, for example, the information to be used for the determination regarding whether to allow the power feeding is the temperature at the predetermined location on the power receiving device 20, the controller 22 determines that the power feeding by the power feeding device 10 should be rejected in a case in which this temperature is equal to or larger than a predetermined temperature. When the temperature of the power receiving device 20 is equal to or larger than the predetermined temperature, there is a possibility that the cable 30 or the power receiving device 20 has a failure (e.g., a damage). In this case, the controller 22 determines that the power feeding by the power feeding device 10 should be rejected.

Next, the controller 22 of the power receiving device 20 transmits the result of the determination regarding whether to allow the power feeding to the power feeding device 10 (Step S14). Specifically, the controller 22 outputs the result of the determination to the communication unit 23. The communication unit 23 transmits the result of the determination output from the controller 22 to the power feeding device 10 via the communication line 32.

The power feeding device 10 receives the result of the determination (Step S15) and controls the power supply to the power receiving device 20 in accordance with the result of the determination that has been received (Step S16). Specifically, the communication unit 13 of the power feeding device 10 receives the result of the determination transmitted from the power receiving device 20 and outputs the result of the determination that has been received to the controller 12. When the result of the determination indicates that the power feeding should be allowed, the controller 12 continues the power feeding from the power feeding device 10 to the power receiving device 20. On the other hand, when the result of the determination indicates that the power feeding should be rejected, the controller 12 stops the power feeding from the power feeding device 10 to the power receiving device 20. When, for example, the result of the determination indicates that the power feeding should be rejected, the controller 12 outputs the control signal for instructing the stop of the power feeding to the power supply output controller 18. When the control signal for instructing the stop of the power feeding is supplied, the power supply output controller 18 stops the power supply to the power supply line 31.

In this case, the controller 12 may decrease the voltage to be supplied from the power feeding device 10 to the power receiving device 20 instead of stopping the power feeding from the power feeding device 10 to the power receiving device 20. In this case, the controller 12 outputs the control signal for reducing the power feeding voltage to the power supply output controller 18. Upon receiving the control signal for reducing the power feeding voltage, the power supply output controller 18 reduces the voltage to be supplied to the power supply line 31.

The controller 22 of the power receiving device 20 interrupts the power supply from the power feeding device 10 in accordance with the result of the determination (Step S17). Specifically, when the result of the determination indicates that the power feeding should be rejected, the controller 22 interrupts the power supplied from the power feeding device 10. When the result of the determination indicates that the power feeding should be rejected, the controller 22 outputs, for example, the control signal for instructing the power interruption to the power supply circuit 28. Upon receiving the control signal for instructing the power interruption, the power supply circuit 28 cuts the connection between the power supply line 31 and the internal circuit (not shown). On the other hand, when the result of the determination indicates that the power feeding should be allowed, the controller 22 continuously receives the power supplied from the power feeding device 10.

The operation of Step S17 may be omitted as appropriate. Further, when the operation of Step S16 is the operation of reducing the power feeding voltage, the operation of Step S17 is omitted. That is, the power supply from the power feeding device 10 is not interrupted.

Further, in Step S14 described above, the controller 22 of the power receiving device 20 may transmit the result of the determination to the power feeding device 10 only when the result of the determination indicates that the power reception should be rejected.

In the technique disclosed in Japanese Unexamined Patent Application Publication No. 2012-177989, when power is fed from a power feeding device to a power receiving device via a cable, it is determined in the power receiving device whether a state of the power feeding is good. When it is determined that the state of the power feeding is poor, a switch provided in the power receiving device is turned off and the power feeding from the power feeding device is stopped.

In the technique disclosed in Japanese Unexamined Patent Application Publication No. 2012-177989, however, only the power receiving device stops power feeding while power feeding device continues feeding power to the power receiving device. Accordingly, if, for example, there is a fault in the cable connected to the power feeding device, since the power feeding device continues feeding power, the faulty area of the cable may be heated or shorted out. Accordingly, in such a power feeding system, there is a problem that security performance is not sufficiently high.

On the other hand, in the power feeding system 1 according to this embodiment, the power receiving device 20 determines whether to allow the power feeding by the power feeding device 10 (Step S13) and the result of the determination is transmitted from the power receiving device 20 to the power feeding device 10 (Step S14). When the result of the determination indicates that the power feeding by the power feeding device 10 should be rejected, the power feeding device 10 stops feeding power to the power receiving device 20 (or reduces the power feeding voltage) (Step S16). Accordingly, the power feeding system 1 according to this embodiment stops the power feeding (or reduces the power feeding voltage) on the side of the power feeding device 10. Therefore, even when the cable has a fault, it is possible to prevent the faulty part of the cable from being heated or shorted out. It is therefore possible to provide the power feeding system and the negotiation controller capable of improving the safety level.

Second Embodiment

Next, a second embodiment will be described. The second embodiment is different from the first embodiment in that the power feeding device 10 performs the determination regarding whether to allow the power feeding. Since the other configurations are similar to those in the power feeding system according to the first embodiment, the overlapping descriptions thereof will be omitted as appropriate.

Since the configurations of the power feeding system according to this embodiment are similar to those of the power feeding system according to the first embodiment shown in FIG. 1, descriptions thereof will be omitted.

Figure 3:
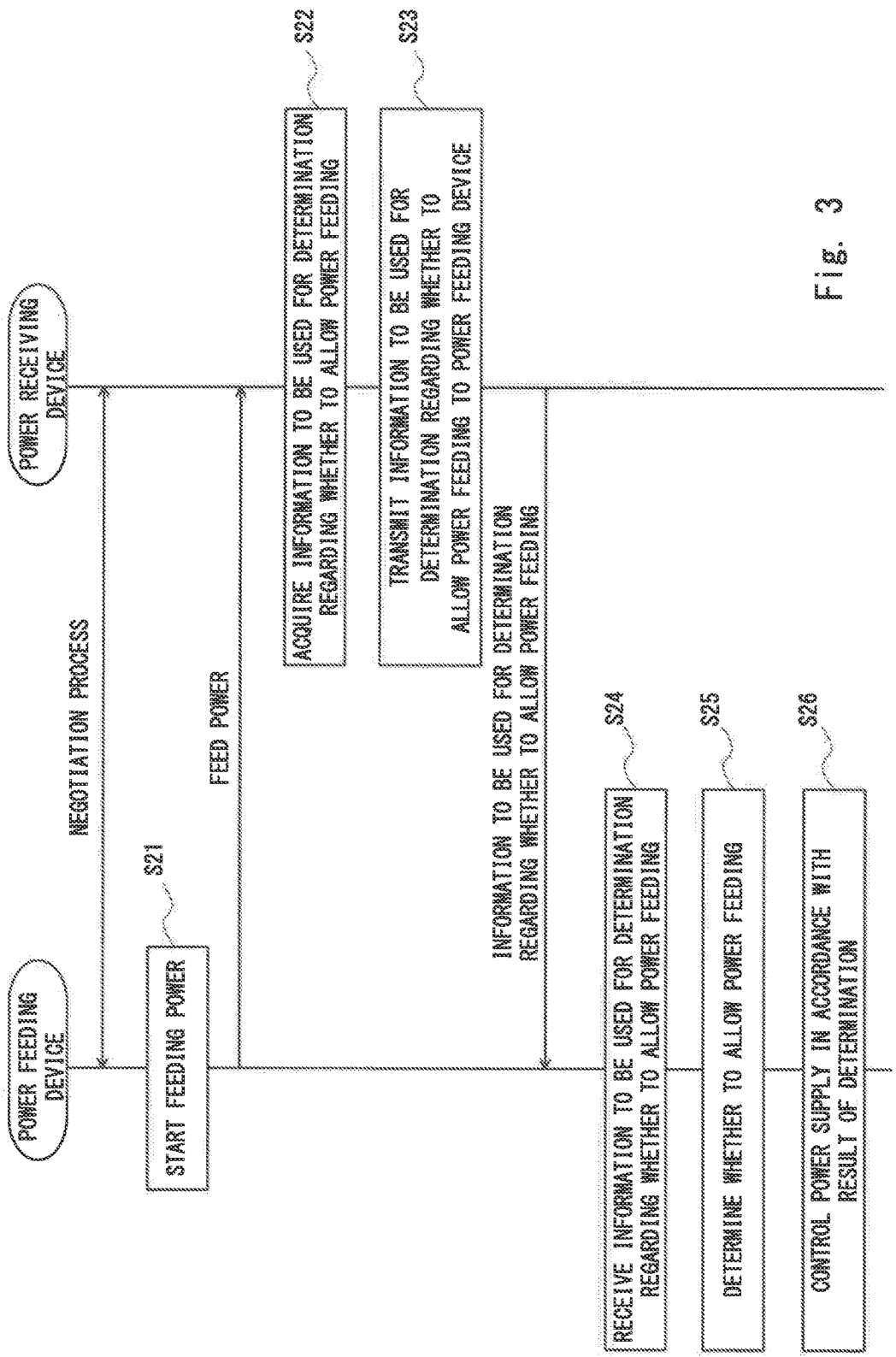
FIG. 3 is a flowchart showing operations of a power feeding system according to a second embodiment.

FIG. 3 is a flowchart showing operations of the power feeding system according to this embodiment. As shown in FIG. 3, in this embodiment as well, the power feeding operation is started when the power feeding device 10 and the power receiving device 20 are connected to each other via the cable 30. When the power feeding operation is started, the power feeding device 10 and the power receiving device 20 communicate with each other to execute the operation of determining the power (voltage) that the power feeding device 10 supplies to the power receiving device 20 (negotiation process). The negotiation process is similar to that described in the first embodiment.

After the negotiation process is completed, the power feeding device 10 starts feeding power to the power receiving device 20 (Step S21). Specifically, the controller 12 of the power feeding device 10 outputs the control signal for supplying the power (voltage) to be supplied determined in the negotiation process described above to the power supply output controller 18. The power supply output controller 18 supplies the power in accordance with the control signal output from the controller 12 to the power receiving device 20 via the power supply line 31.

Next, the information acquisition unit 24 or the power supply circuit 28 of the power receiving device 20 acquires information to be used for the determination regarding whether to allow the power feeding by the power feeding device 10 (Step S22). The acquired information is supplied to the controller 22. The information to be used for the determination regarding whether to allow the power feeding includes, for example, the voltage value of the power supply line 31 measured in the power receiving device 20 (the details thereof will be described in the fourth to sixth embodiments), the number of times of insertion and removal of the cable 30 to and from the connector 29 included in the power receiving device 20, the temperature at the predetermined location on the power receiving device 20 and the like. These are merely examples and the power feeding system 1 according to this embodiment may use other information as the information to be used for the determination regarding whether to allow the power feeding.

Next, the controller 22 of the power receiving device 20 transmits the information to be used for the determination regarding whether to allow the power feeding to the power feeding device 10 (Step S23). Specifically, the controller 22 outputs the information to be used for the determination regarding whether to allow the power feeding to the communication unit 23. The communication unit 23 transmits the information to be used for the determination regarding whether to allow the power feeding output from the controller 22 to the power feeding device 10 via the communication line 32.

The controller 12 of the power feeding device 10 receives the information to be used for the determination regarding whether to allow the power feeding (Step S24) and determines whether to allow the power feeding using the received information (Step S25). In this case, the controller 12 of the power feeding device 10 serves as a determination unit. The determination regarding whether to allow the power feeding is similar to that described in the first embodiment.

The power feeding device 10 controls, in accordance with the result of the determination in Step S25, the power supply to the power receiving device 20 (Step S26). Specifically, when the result of the determination indicates that the power feeding should be allowed, the controller 12 continues the power feeding from the power feeding device 10 to the power receiving device 20. On the other hand, when the result of the determination indicates that the power feeding should be rejected, the controller 12 stops the power feeding from the power feeding device 10 to the power receiving device 20. When the result of the determination indicates that the power feeding should be rejected, the controller 12 outputs, for example, the control signal for instructing the stop of the power feeding to the power supply output controller 18. When the control signal for instructing the stop of the power feeding is supplied, the power supply circuit 18 stops the power supply to the power supply line 31.

In this case, the controller 12 may reduce the voltage of the power to be supplied from the power feeding device 10 to the power receiving device 20 instead of stopping the power feeding from the power feeding device 10 to the power receiving device 20. In this case, the controller 12 outputs the control signal for reducing the power feeding voltage to the power supply output controller 18. When the control signal for reducing the power feeding voltage is supplied, the power supply output controller 18 reduces the voltage to be supplied to the power supply line 31.

In the power feeding system according to this embodiment described above, the power receiving device 20 transmits the information to be used for the determination regarding whether to allow the power feeding to the power feeding device 10 (Step S23). The power feeding device 10 determines whether to allow the power feeding (Step S25). When the result of the determination indicates that the power feeding should be rejected, the power feeding device 10 stops feeding power to the power receiving device 20 (or reduces the power feeding voltage) (Step S26). In this way, in the power feeding system according to this embodiment, the determination regarding whether to allow the power feeding by the power feeding device 10 is not executed on the side of the power receiving device 20. Therefore, the connection between the power supply line 31 and the internal circuit is not controlled by the power supply circuit 28. However, the power feeding device 10 determines whether the power feeding should be allowed and stops the power feeding. Therefore, when the result of the determination indicates that the power feeding should be rejected, the power feeding to the power receiving device is not performed. Further, since the power feeding device 10 stops the power feeding, even when there is a fault in the cable, it is possible to prevent the faulty area of the cable from being heated or shorted out. It is therefore possible to provide the power feeding system and the negotiation controller capable of improving the safety level.

Third Embodiment

Next, a third embodiment will be described. The third embodiment is different from the first and second embodiments in that both of the power feeding device 10 and the power receiving device 20 perform the determination regarding whether to allow the power feeding. Since the other configurations are similar to those of the power feeding systems according to the first and second embodiments, overlapping descriptions thereof will be omitted as appropriate.

Since the configurations of the power feeding system according to this embodiment are similar to those of the power feeding system according to the first embodiment shown in FIG. 1, descriptions thereof will be omitted.

Figure 4:
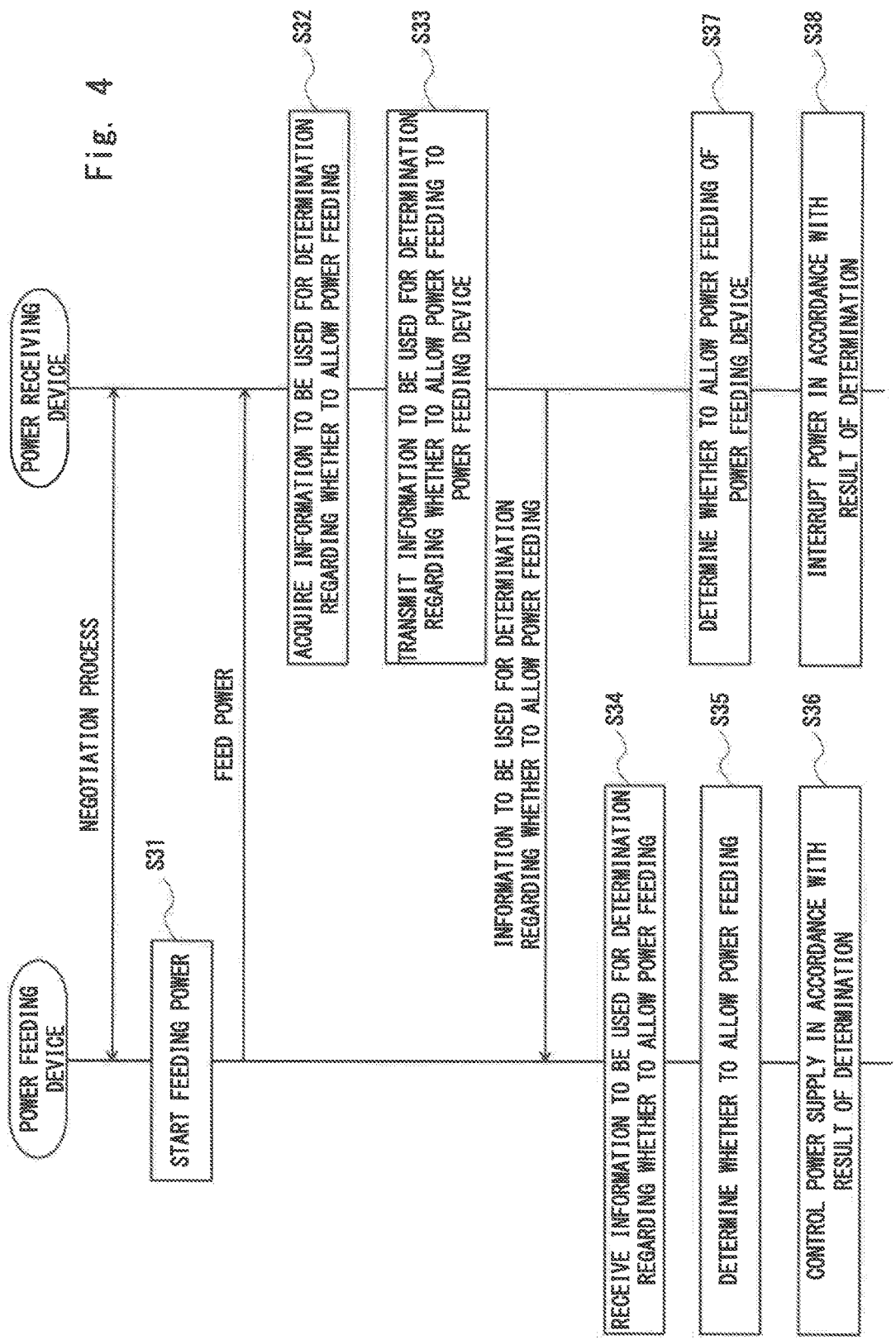
FIG. 4 is a flowchart showing operations of a power feeding system according to a third embodiment.

FIG. 4 is a flowchart showing operations of the power feeding system according to this embodiment. As shown in FIG. 4, in this embodiment as well, the power feeding operation is started when the power feeding device 10 and the power receiving device 20 are connected to each other via the cable 30. When the power feeding operation is started, the power feeding device 10 and the power receiving device 20 communicate with each other to execute the operation of determining the power (voltage) that the power feeding device 10 supplies to the power receiving device 20 (negotiation process). The negotiation process is similar to that described in the first embodiment.

After the negotiation process is completed, the power feeding device 10 starts feeding power to the power receiving device 20 (Step S31). Specifically, the controller 12 of the power feeding device 10 outputs the control signal for supplying the power (voltage) to be supplied determined in the negotiation process described above to the power supply output controller 18. The power supply output controller 18 supplies the power in accordance with the control signal output from the controller 12 to the power receiving device 20 via the power supply line 31.

Next, the information acquisition unit 24 or the power supply circuit 28 of the power receiving device 20 acquires the information to be used for the determination regarding whether to allow the power feeding by the power feeding device 10 (Step S32). The acquired information is supplied to the controller 22. The information to be used for the determination regarding whether to allow the power feeding includes, for example, the voltage value of the power supply line 31 measured in the power receiving device 20 (the details thereof will be described in the fourth to sixth embodiments), the number of times of insertion and removal of the cable 30 to and from the connector 29 included in the power receiving device 20, the temperature at the predetermined location on the power receiving device 20 and the like. These are merely examples and the power feeding system 1 according to this embodiment may use other information as the information to be used for the determination regarding whether to allow the power feeding.

Next, the controller 22 of the power receiving device 20 transmits the information to be used for the determination regarding whether to allow the power feeding to the power feeding device 10 (Step S33). Specifically, the controller 22 outputs the information to be used for the determination regarding whether to allow the power feeding to the communication unit 23. The communication unit 23 transmits the information to be used for the determination regarding whether to allow the power feeding output from the controller 22 to the power feeding device 10 via the communication line 32.

The controller 12 of the power feeding device 10 receives the information to be used for the determination regarding whether to allow the power feeding (Step S34) and determines whether to allow the power feeding using the received information (Step S35). In this case, the controller 12 of the power feeding device 10 serves as a determination unit. The determination regarding whether to allow the power feeding is similar to that described in the first embodiment.

The power feeding device 10 controls the power supply to the power receiving device 20 in accordance with the result of the determination in Step S35 (Step S36). Specifically, when the result of the determination indicates that the power feeding should be allowed, the controller 12 continues the power feeding from the power feeding device 10 to the power receiving device 20. On the other hand, when the result of the determination indicates that the power feeding should be rejected, the controller 12 stops the power feeding from the power feeding device 10 to the power receiving device 20. When, for example, the result of the determination indicates that the power feeding should be rejected, the controller 12 outputs the control signal for instructing the stop of the power feeding to the power supply output controller 18. When the control signal for instructing the stop of the power feeding is supplied, the power supply output controller 18 stops the power supply to the power supply line 31.

Further, the controller 22 of the power receiving device 20 determines whether to allow the power feeding by the power feeding device 10 using the information to be used for the determination regarding whether to allow the power feeding (Step S37). In this case, the controller 22 of the power receiving device 20 serves as a determination unit. The operation in Step S37 is similar to the operation in Step S35.

The controller 22 of the power receiving device 20 interrupts the power supply from the power feeding device 10 in accordance with the result of the determination in Step S37 (Step S38). Specifically, when the result of the determination indicates that the power feeding by the power feeding device 10 should be rejected, the controller 22 interrupts the power supplied from the power feeding device 10. When, for example, the result of the determination indicates that the power feeding should be rejected, the controller 22 outputs the control signal for instructing the power interruption to the power supply circuit 28. When the control signal for instructing the power interruption is supplied, the power supply circuit 28 cuts the connection between the power supply line 31 and the internal circuit (not shown). On the other hand, when the result of the determination indicates that the power feeding by the power feeding device 10 should be allowed, the controller 22 continuously receives the power supplied from the power feeding device 10.

In the power feeding system according to this embodiment described above, the power receiving device 20 transmits the information to be used for the determination regarding whether to allow the power feeding to the power feeding device 10 (Step S33). The power feeding device 10 determines whether to allow the power feeding (Step S35). When the result of the determination indicates that the power feeding should be rejected, the power feeding device 10 stops feeding power to the power receiving device 20 (or reduces the power feeding voltage) (Step S36). As stated above, in the power feeding system according to this embodiment, the power feeding is stopped on the side of the power feeding device 10. Therefore, even when the cable has a fault, it is possible to prevent the faulty part of the cable from being heated or shorted out. It is therefore possible to provide the power feeding system and the negotiation controller capable of improving the safety level.

In the power feeding system according to this embodiment, in particular, both of the power feeding device 10 and the power receiving device 20 perform the determination regarding whether to allow the power feeding by the power feeding device 10, whereby it is possible to perform the determination regarding whether to allow the power feeding more definitely. That is, even when an erroneous determination (to continue the power feeding) has been made in one of the power feeding device 10 and the power receiving device 20 when the power feeding should be stopped, the other one of them makes a correct determination (to stop the power feeding), whereby it is possible to secure the security performance of the power feeding system.

Fourth Embodiment

Next, a fourth embodiment will be described. In the fourth embodiment, specific configurations and operations when a voltage value of a power supply line of a power receiving device is used as the information to be used for a determination regarding whether to allow the power feeding by the power feeding device will be described.

Figure 5:
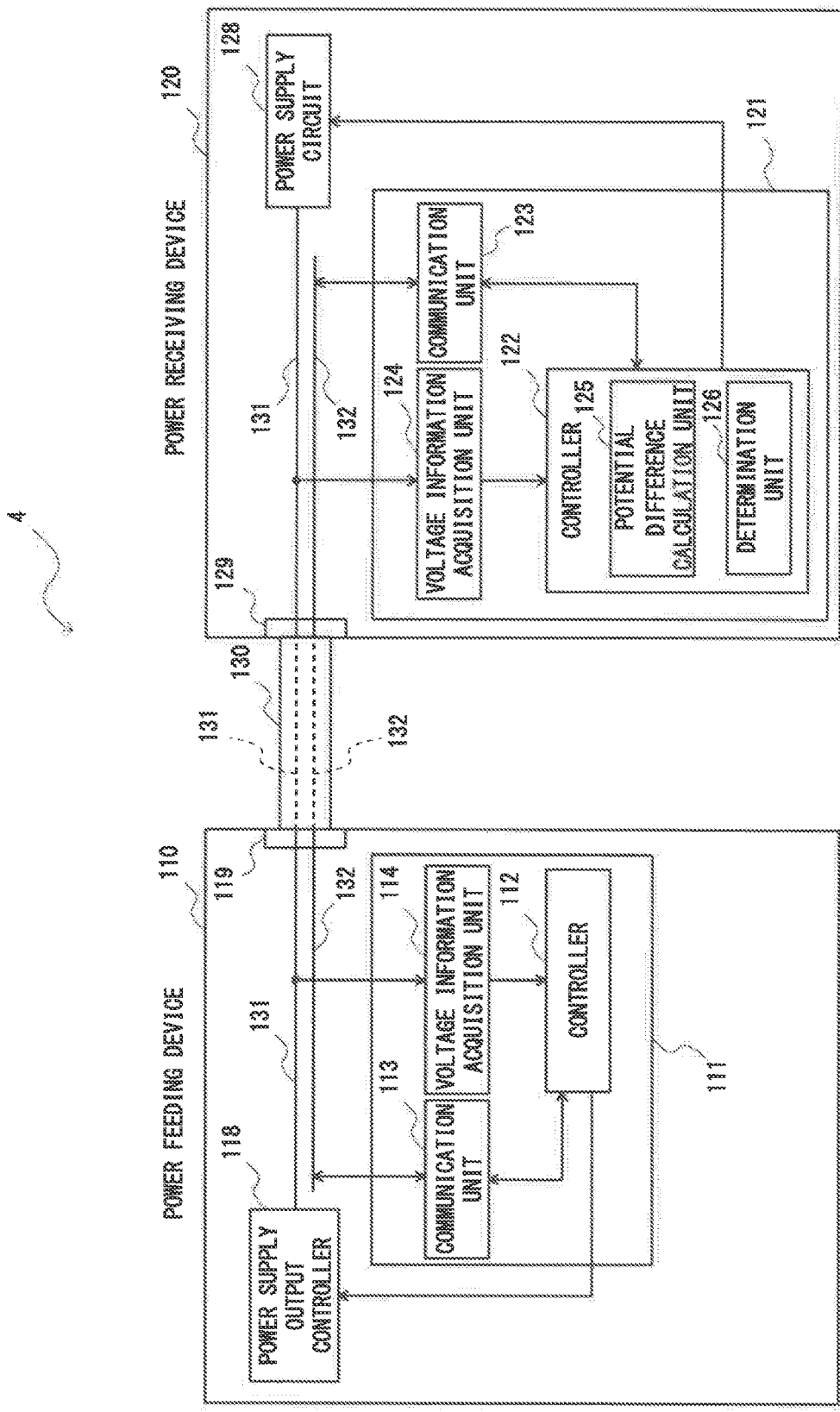
FIG. 5 is a block diagram showing a power feeding system according to a fourth embodiment.

FIG. 5 is a block diagram showing a power feeding system according to the fourth embodiment. As shown in FIG. 5, a power feeding system 4 according to this embodiment includes a power feeding device 110 and a power receiving device 120. The power feeding device 110 includes a negotiation controller 111, a power supply output controller 118, and a connector 119. The negotiation controller 111 includes a controller 112, a communication unit 113, and a voltage information acquisition unit 114. The power receiving device 120 includes a negotiation controller 121, a power supply circuit 128, and a connector 129. The negotiation controller 121 includes a controller 122, a communication unit 123, and a voltage information acquisition unit 124. The controller 122 includes a potential difference calculation unit 125 and a determination unit 126.

The power feeding device 110 and the power receiving device 120 are connected to each other via a cable 130. The cable 130 includes a power supply line 131 and a communication line 132. The power feeding device 110 is configured to be able to supply power to the power receiving device 120 via the power supply line 131. The power feeding device 110 and the power receiving device 120 are configured to be able to communicate with each other via the communication line 132.

The power feeding device 110 and the power receiving device 120 are embedded in, for example, an information device such as a computer or a peripheral device and the power feeding device 110 and the power receiving device 120 are connected to each other using the cable 130, whereby the information communication and the power supply between the devices can be concurrently performed. The power feeding device 110 and the power receiving device 120 are, for example, devices that are equipped with USB terminals. In this case, the connector 119 and the connector 129 are USB connectors and the cable 130 is a USB cable. USB Power Delivery standards define, for example, that, power between 5 V-20 V (up to 100 W) can be supplied. Further, the power feeding device 210 may be an AC adapter.

The negotiation controller 111 included in the power feeding device 110 includes the controller 112, the communication unit 113, and the voltage information acquisition unit 114. The communication unit 113 is configured to be able to communicate with the negotiation controller 121 included in the power receiving device 120 via the communication line 132. The voltage information acquisition unit 114 measures the voltage value of the power supply line 131 of the power feeding device 110 and outputs the voltage value that has been measured to the controller 112.

The controller 112 communicates with the negotiation controller 121 included in the power receiving device 120 to determine the power (voltage) to be supplied to the power receiving device 120. The controller 112 determines the power (voltage) to be supplied to the power receiving device 120 based on, for example, the power (voltage) requested from the negotiation controller 121 included in the power receiving device 120. Further, the controller 112 outputs a control signal for controlling the power that the power feeding device 110 supplies to the power receiving device 120 to the power supply output controller 118.

The power supply output controller 118 controls, in accordance with the control signal output from the controller 112, the power that the power feeding device 110 supplies to the power receiving device 120. A power supply circuit (not shown) included in the power supply output controller 118 is connected, for example, and the power supply output controller 118 changes, in accordance with the control signal output from the controller 112, the voltage supplied from the power supply circuit (not shown) and supplies the resulting voltage to the power supply line 131. According to the aforementioned configuration, the power supply output controller 118 is able to supply power of a different voltage to the power supply line 131. Further, when the control signal output from the controller 112 is a control signal for instructing stop of the power feeding, the power supply output controller 118 stops the power supply to the power supply line 131.

The negotiation controller 121 included in the power receiving device 120 includes the controller 122, the communication unit 123, and the voltage information acquisition unit 124. The communication unit 123 is configured to be able to communicate with the negotiation controller 111 included in the power feeding device 110 via the communication line 132.

The voltage information acquisition unit 124 measures the voltage value of the power supply line 131 and outputs the voltage value that has been measured to the controller 122. The voltage value measured in the voltage information acquisition unit 124 is used as information to be used for the determination regarding whether to allow the power feeding.

The controller 122 communicates with the negotiation controller 111 included in the power feeding device 110 to determine the power (voltage) to be received from the power feeding device 110. The potential difference calculation unit 125 included in the controller 122 calculates the potential difference between the voltage value that the power feeding device 110 supplies to the power receiving device 120 (that is, the voltage value measured in the voltage information acquisition unit 114) and the voltage value measured in the voltage information acquisition unit 124.

The determination unit 126 determines whether to allow the power feeding using the potential difference calculated in the potential difference calculation unit 125. Specifically, when the potential difference calculated in the potential difference calculation unit 125 is equal to or larger than a predetermined value, the determination unit 126 determines that the power feeding from the power feeding device 110 should be rejected. The case in which the potential difference calculated in the potential difference calculation unit 125 becomes equal to or larger than the predetermined value includes, for example, a case in which the voltage value on the side of the power receiving device 120 has been reduced due to the presence of a failure (e.g., a damage) in the cable 130. Further, the controller 122 outputs a control signal for controlling the power supply circuit 128 to the power supply circuit 128.

The power supply circuit 128 controls the state of the power feeding from the power feeding device 110 in accordance with the control signal output from the controller 122. An internal circuit (not shown) is connected, for example, to the output stage of the power supply circuit 128 and the power supply circuit 128 controls the supply of the power to the internal circuit in accordance with the control signal output from the controller 122. When, for example, the control signal output from the controller 122 is the control signal indicating that the supply of the power to the internal circuit should be interrupted, the power supply circuit 128 cuts the connection between the power supply line 131 and the internal circuit.

Next, operations of the power feeding system 4 according to this embodiment will be described.

Figure 6:
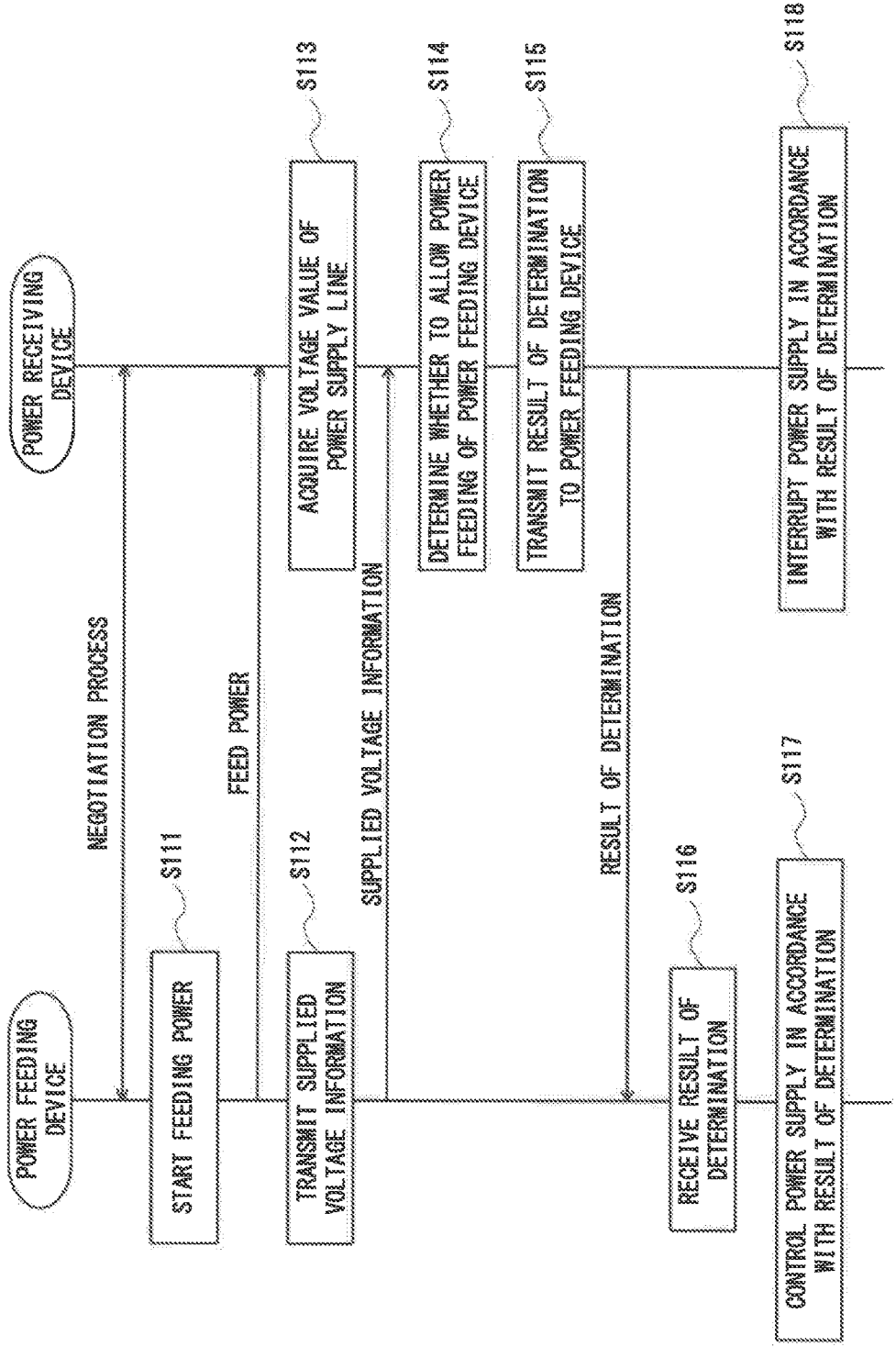
FIG. 6 is a flowchart showing operations of the power feeding system according to the fourth embodiment.

FIG. 6 is a flowchart showing operations of the power feeding system according to this embodiment. In the power feeding system 4 according to this embodiment, the power feeding device 110 and the power receiving device 120 are connected to each other via the cable 130 to start the power feeding operation. When the power feeding operation is started, the power feeding device 110 and the power receiving device 120 communicate with each other to execute the operation of determining the power (voltage) that the power feeding device 110 supplies to the power receiving device 120 (negotiation process).

Specifically, the negotiation controller 121 included in the power receiving device 120 transmits information indicating the power that the power receiving device 120 requires to the negotiation controller 111 included in the power feeding device 110. Further, the negotiation controller 111 included in the power feeding device 110 transmits information regarding the power that the power feeding device 110 can supply to the negotiation controller 121 included in the power receiving device 120. When the power receiving device 120 and the power feeding device 110 have agreed on the power to be supplied, the negotiation process is ended. On the other hand, when the power receiving device 120 and the power feeding device 110 have not agreed on the power to be supplied, the negotiation controller 121 included in the power receiving device 120 transmits information regarding power that is lower than the power that it has presented last time to the negotiation controller 111 included in the power feeding device 110. This operation is repeated until the power receiving device 120 and the power feeding device 110 agree on the power to be supplied. According to this process, the power (voltage) that the power feeding device 110 supplies to the power receiving device 120 is determined.

After the negotiation process described above is completed, the power feeding device 110 starts feeding power to the power receiving device 120 (Step S111). Specifically, the controller 112 of the power feeding device 110 outputs the control signal for supplying the power (voltage) to be supplied determined in the negotiation process described above to the power supply output controller 118. The power supply output controller 118 supplies the power in accordance with the control signal output from the controller 112 to the power receiving device 120 via the power supply line 131.

Next, the voltage information acquisition unit 114 of the power feeding device 110 measures the voltage value of the power supply line 131 of the power feeding device 110 and outputs the voltage value that has been measured to the controller 112. The controller 112 transmits the voltage value that has been measured to the power receiving device 120 via the communication unit 113 as supplied voltage information of the power feeding device 110 (Step S112).

Further, the voltage information acquisition unit 124 of the power receiving device 120 measures the voltage value of the power supply line 131 of the power receiving device 120 and outputs the voltage value that has been measured to the controller 122 (Step S113). The voltage value measured in the voltage information acquisition unit 124 corresponds to the information to be used for the determination regarding whether to allow the power feeding.

Next, the controller 122 of the power receiving device 120 determines, using the voltage value measured in the voltage information acquisition unit 114 of the power feeding device 110 (hereinafter, this voltage value will also be referred to as a supplied voltage value of the power feeding device 110) and the voltage value measured in the voltage information acquisition unit 124 of the power receiving device 120 (hereinafter, this voltage value will also be referred to as a received voltage value of the power receiving device 120), whether to allow the power feeding by the power feeding device 110 (Step S114).

Specifically, the potential difference calculation unit 125 included in the controller 122 calculates the potential difference between the supplied voltage value of the power feeding device 110 and the received voltage value of the power receiving device 120. When the potential difference calculated in the potential difference calculation unit 125 is equal to or larger than a predetermined value, the determination unit 126 determines that the power feeding from the power feeding device 110 should be rejected. On the other hand, when the potential difference calculated in the potential difference calculation unit 125 is smaller than the predetermined value, the determination unit 126 determines that the power feeding should be allowed.

That is, when the potential difference between the supplied voltage value of the power feeding device 110 and the received voltage value of the power receiving device 120 is large, that is, when the received voltage value of the power receiving device 120 is greatly smaller than the supplied voltage value of the power feeding device 110, it can be considered that the received voltage value in the power receiving device 120 has been reduced due to some failure (e.g., damage) in the cable 130. In this case, the determination unit 126 determines that the power feeding from the power feeding device 110 should be rejected.

On the other hand, when the potential difference between the supplied voltage value of the power feeding device 110 and the received voltage value of the power receiving device 120 is small or zero, that is, when the received voltage value of the power receiving device 120 is similar to or slightly smaller than the supplied voltage value of the power feeding device 110, it is considered that the state of the cable 130 is good. In this case, the determination unit 126 determines that the power feeding should be allowed.

Next, the controller 122 of the power receiving device 120 transmits the result of the determination regarding whether to allow the power feeding by the power feeding device 110 to the power feeding device 110 (Step S115). Specifically, the controller 122 outputs the result of the determination to the communication unit 123. The communication unit 123 transmits the result of the determination output from the controller 122 to the power feeding device 110 via the communication line 132.

The power feeding device 110 receives the result of the determination (Step S116) and controls the power supply to the power receiving device 120 in accordance with the result of the determination (Step S117). Specifically, the communication unit 113 of the power feeding device 110 receives the result of the determination transmitted from the power receiving device 120 and outputs the result of the determination that has been received to the controller 112. When the result of the determination indicates that the power feeding should be allowed, the controller 112 continues the power feeding from the power feeding device 110 to the power receiving device 120. On the other hand, when the result of the determination indicates that the power feeding should be rejected, the controller 112 stops the power feeding from the power feeding device 110 to the power receiving device 120. When the result of the determination indicates that the power feeding should be rejected, the controller 112 outputs, for example, the control signal for instructing the stop of the power feeding to the power supply output controller 118. When the control signal for instructing the stop of the power feeding is supplied, the power supply output controller 118 stops the power supply to the power supply line 131.

In this case, the controller 112 may reduce the voltage to be supplied from the power feeding device 110 to the power receiving device 120 instead of stopping the power feeding from the power feeding device 110 to the power receiving device 120. In this case, the controller 112 outputs the control signal for reducing the power feeding voltage to the power supply output controller 118. When the control signal for reducing the power feeding voltage is supplied, the power supply output controller 118 reduces the voltage to be supplied to the power supply line 131.

The controller 122 of the power receiving device 120 interrupts the power supply from the power feeding device 110 in accordance with the result of the determination (Step S118). Specifically, when the result of the determination indicates that the power feeding should be rejected, the controller 122 interrupts the power supplied from the power feeding device 110. When the result of the determination indicates that the power feeding should be rejected, the controller 122 outputs, for example, the control signal for instructing the power interruption to the power supply circuit 128. When the control signal for instructing the power interruption is supplied, the power supply circuit 128 cuts the connection between the power supply line 131 and the internal circuit (not shown). On the other hand, when the result of the determination indicates that the power feeding should be allowed, the controller 122 continuously receives the power supplied from the power feeding device 110.

The operation of Step S118 can be omitted as appropriate. Further, when the operation of Step S117 is an operation of reducing the power feeding voltage, the operation of Step S118 is omitted. That is, the power supply from the power feeding device 110 is not interrupted.

Further, in Step S115 described above, the controller 122 of the power receiving device 120 may transmit the result of the determination to the power feeding device 110 only when the result of the determination indicates that the power feeding by the power feeding device 110 should be rejected.

In the aforementioned example, the case in which the voltage value of the power feeding device 110 is measured using the voltage information acquisition unit 114 of the power feeding device 110 and the voltage value that has been measured is used as the supplied voltage information of the power feeding device 110 has been described. However, in this embodiment, the voltage value determined in the negotiation process between the power feeding device 110 and the power receiving device 120 may be used as the supplied voltage information of the power feeding device 110. In this case, the voltage information acquisition unit 114 of the power feeding device 110 can be omitted. Further, since the power receiving device 120 acquires the supplied voltage information of the power feeding device 110 in advance in the negotiation process, the process of Step S112 shown in FIG. 6 can be omitted.

In the power feeding system 4 according to this embodiment, the power receiving device 120 determines whether to allow the power feeding by the power feeding device 110 (Step S114) and the result of the determination is transmitted from the power receiving device 120 to the power feeding device 110 (Step S115). When the result of the determination indicates that the power feeding should be rejected, the power feeding device 110 stops feeding power to the power receiving device 120 (or reduces the power feeding voltage) (Step S117). In this way, in the power feeding system 4 according to this embodiment, the power feeding is stopped (or the power feeding voltage is reduced) in the power feeding device 110. Therefore, even when the cable has a fault, it is possible to prevent the faulty part of the cable from being heated or shorted out. It is therefore possible to provide the power feeding system and the negotiation controller capable of improving the safety level.

Fifth Embodiment

Figure 7:
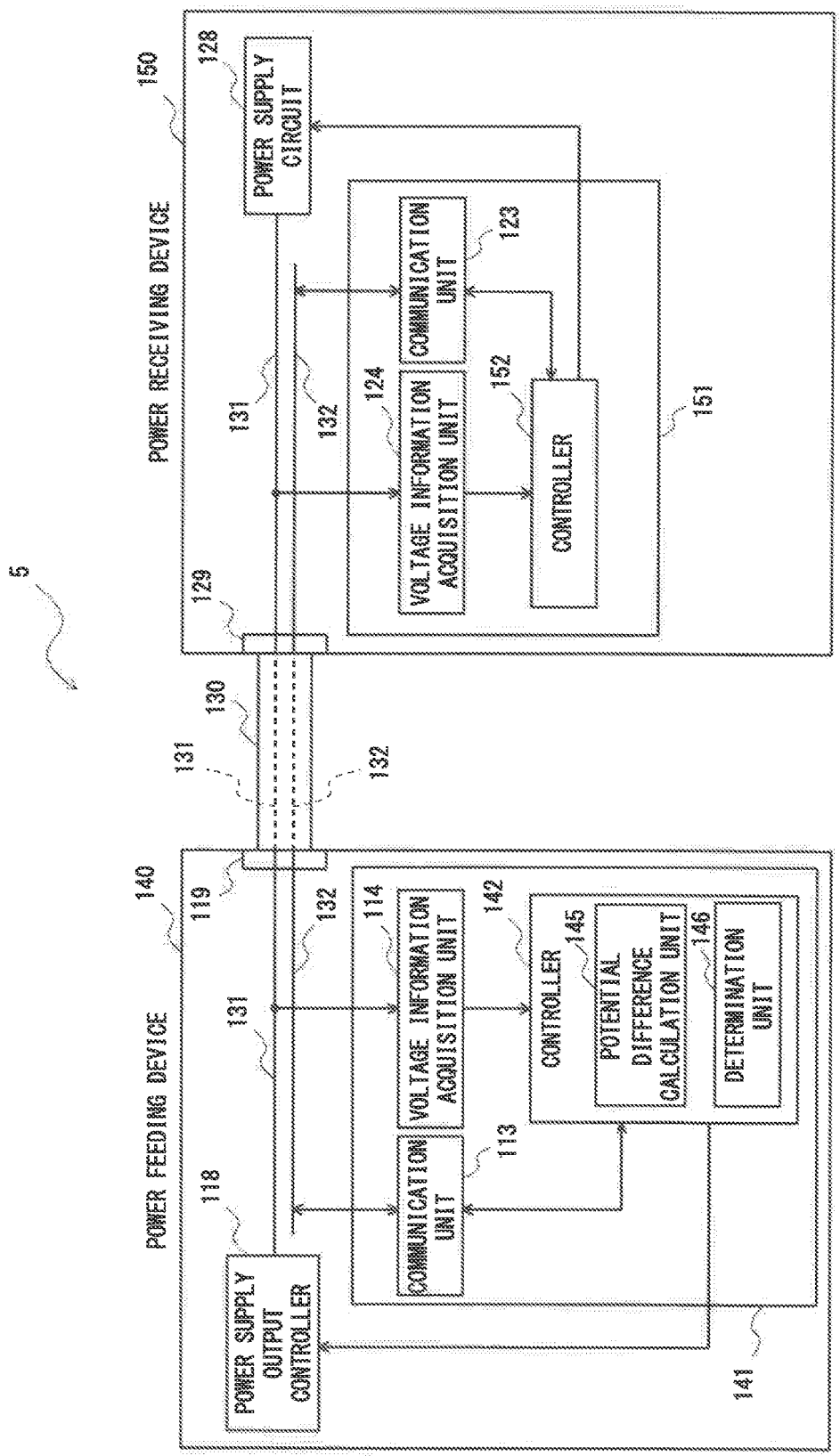
FIG. 7 is a block diagram showing a power feeding system according to a fifth embodiment.

Next, a fifth embodiment will be described. FIG. 7 is a block diagram showing a power feeding system according to the fifth embodiment. A power feeding system 5 according to this embodiment is different from the power feeding system 4 described in the fourth embodiment in that a power feeding device 140 performs the determination regarding whether to allow the power feeding. Since the other configurations are similar to those of the power feeding system 4 according to the fourth embodiment, the same components are denoted by the same reference symbols and overlapping descriptions thereof will be omitted as appropriate.

As shown in FIG. 7, the power feeding system 5 according to this embodiment includes the power feeding device 140 and a power receiving device 150. The power feeding device 140 includes a negotiation controller 141, a power supply output controller 118, and a connector 119. The negotiation controller 141 includes a controller 142, a communication unit 113, and a voltage information acquisition unit 114. The controller 142 includes a potential difference calculation unit 145 and a determination unit 146. The power receiving device 150 includes a negotiation controller 151, a power supply circuit 128, and a connector 129. The negotiation controller 151 includes a controller 152, a communication unit 123, and a voltage information acquisition unit 124.

The power feeding device 140 and the power receiving device 150 are connected to each other via a cable 130. The cable 130 includes a power supply line 131 and a communication line 132. The power feeding device 110 is configured to be able to supply power to the power receiving device 120 via the power supply line 131. The power feeding device 110 and the power receiving device 120 are configured to be able to communicate with each other via the communication line 132.

The negotiation controller 141 included in the power feeding device 140 includes the controller 142, the communication unit 113, and the voltage information acquisition unit 114. The communication unit 113 is configured to be able to communicate with the negotiation controller 151 included in the power receiving device 150 via the communication line 132. The voltage information acquisition unit 114 measures the voltage value of the power supply line 131 of the power feeding device 140 and outputs the voltage value that has been measured to the controller 142.

The controller 142 communicates with the negotiation controller 151 included in the power receiving device 150 and determines the power (voltage) to be supplied to the power receiving device 150. The controller 142 determines the power (voltage) to be supplied to the power receiving device 150 based on, for example, the power (voltage) requested from the negotiation controller 151 included in the power receiving device 150.

Further, the potential difference calculation unit 145 included in the controller 142 calculates the potential difference between the voltage value measured in the voltage information acquisition unit 114 of the power feeding device 140 and the voltage value measured in the voltage information acquisition unit 124 of the power receiving device 150.

The determination unit 146 determines whether to allow the power feeding by the power feeding device 140 using the potential difference calculated in the potential difference calculation unit 145. Specifically, the determination unit 146 determines that the power feeding by the power feeding device 140 should be rejected when the potential difference calculated in the potential difference calculation unit 145 is equal to or larger than a predetermined value. The case in which the potential difference calculated in the potential difference calculation unit 145 becomes equal to or larger than the predetermined value includes, for example, the case in which the voltage value on the side of the power receiving device 150 has been reduced due to the presence of a failure (e.g., a damage) in the cable 130. Further, the controller 142 outputs a control signal for controlling the power supply output controller 118 to the power supply output controller 118.

The power supply output controller 118 controls, in accordance with the control signal output from the controller 142, the power that the power feeding device 140 supplies to the power receiving device 150. The power supply output controller 118 is provided with, for example, a power supply circuit (not shown) and the power supply output controller 118 changes, in accordance with the control signal output from the controller 142, the voltage supplied from the power supply circuit (not shown) and supplies the resulting voltage to the power supply line 131. According to the aforementioned configuration, the power supply output controller 118 is able to supply power of a different voltage to the power supply line 131. Further, when the control signal output from the controller 142 is a control signal for instructing stop of the power feeding, the power supply output controller 118 stops the power supply to the power supply line 131.

The negotiation controller 151 included in the power receiving device 150 includes the controller 152, the communication unit 123, and the voltage information acquisition unit 124. The communication unit 123 is configured to be able to communicate with the negotiation controller 141 included in the power feeding device 140 via the communication line 132. The voltage information acquisition unit 124 measures the voltage value of the power supply line 131 and outputs the voltage value that has been measured to the controller 152. The voltage value measured in the voltage information acquisition unit 124 is used as the information to be used for the determination regarding whether to allow the power feeding by the power feeding device 140.

The controller 152 communicates with the negotiation controller 141 included in the power feeding device 140 and determines the power (voltage) to be received from the power feeding device 140. Further, the controller 152 outputs a control signal for controlling the power supply circuit 128 to the power supply circuit 128.

The power supply circuit 128 controls, in accordance with the control signal output from the controller 122, the state of power receiving from the power feeding device 140. An internal circuit (not shown) is connected, for example, to the output stage of the power supply circuit 128 and the power supply circuit 128 controls, in accordance with the control signal output from the controller 152, the supply of the power to the internal circuit.

Next, operations of the power feeding system 5 according to this embodiment will be described.

Figure 8:
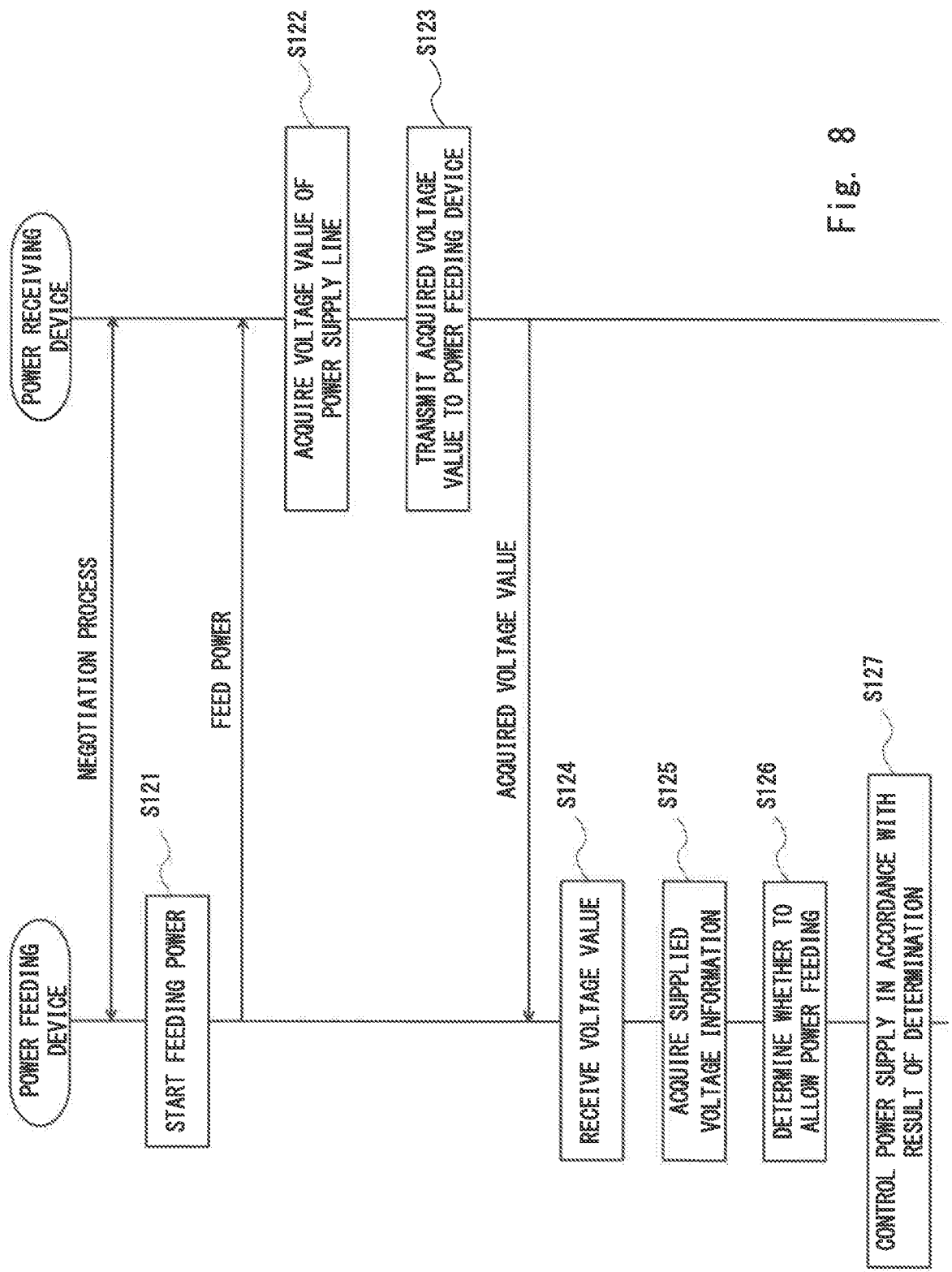
FIG. 8 is a flowchart showing operations of the power feeding system according to the fifth embodiment.

FIG. 8 is a flowchart showing operations of the power feeding system according to this embodiment. In the power feeding system 5 according to this embodiment, when the power feeding device 140 and the power receiving device 150 are connected to each other via the cable 130, the power feeding operation is started. When the power feeding operation is started, the power feeding device 140 and the power receiving device 150 communicate with each other to execute the operation of determining the power (voltage) that the power feeding device 140 supplies to the power receiving device 150. The negotiation process is similar to that described in the fourth embodiment.

After the negotiation process is completed, the power feeding device 140 starts feeding power to the power receiving device 150 (Step S121). Specifically, the controller 142 of the power feeding device 140 outputs a control signal for supplying the power (voltage) to be supplied determined in the negotiation process described above to the power supply output controller 118. The power supply output controller 118 supplies power in accordance with the control signal output from the controller 142 to the power receiving device 150 via the power supply line 131.

Next, the voltage information acquisition unit 124 of the power receiving device 150 measures the voltage value of the power supply line 131 of the power receiving device 150 and outputs the voltage value that has been measured to the controller 152 (Step S122). The voltage value measured in the voltage information acquisition unit 124 corresponds to the information to be used for the determination regarding whether to allow the power feeding.

The controller 152 of the power receiving device 150 transmits the voltage value acquired by the voltage information acquisition unit 124 to the power feeding device 140 (Step S123). Specifically, the controller 152 outputs the voltage value supplied from the voltage information acquisition unit 124 to the communication unit 123. The communication unit 123 transmits the voltage value output from the controller 152 to the power feeding device 140 via the communication line 132. The power feeding device 140 receives the voltage value transmitted from the power receiving device 150 using the communication unit 113 and outputs the voltage value that has been received to the controller 142 (Step S124).

Further, the voltage information acquisition unit 114 of the power feeding device 140 measures the voltage value of the power supply line 131 of the power feeding device 140 and outputs the voltage value that has been measured to the controller 142 (Step S125). The controller 142 determines, using the voltage value measured in the voltage information acquisition unit 114 of the power feeding device 140 (hereinafter it will also be referred to as a supplied voltage value of the power feeding device 140) and the voltage value measured in the voltage information acquisition unit 124 of the power receiving device 150 (hereinafter it will also be referred to as a received voltage value of the power receiving device 150), whether to allow the power feeding by the power feeding device 140 (Step S126).

Specifically, the potential difference calculation unit 145 included in the controller 142 calculates the potential difference between the supplied voltage value of the power feeding device 140 and the received voltage value of the power receiving device 150. Then the determination unit 146 determines that the power feeding by the power feeding device 140 should be rejected when the potential difference calculated in the potential difference calculation unit 145 is equal to or larger than a predetermined value. On the other hand, the determination unit 146 determines that the power feeding should be allowed when the potential difference calculated in the potential difference calculation unit 145 is smaller than the predetermined value.

That is, when the potential difference between the supplied voltage value of the power feeding device 140 and the received voltage value of the power receiving device 150 is large, that is, when the received voltage value of the power receiving device 150 is greatly smaller than the supplied voltage value of the power feeding device 140, it can be considered that the received voltage value on the side of the power receiving device 150 has been reduced due to some failure (e.g., damage) in the cable 130. In this case, the determination unit 146 determines that the power feeding by the power feeding device 140 should be rejected.

On the other hand, when the potential difference between the supplied voltage value of the power feeding device 140 and the received voltage value of the power receiving device 150 is small or zero, that is, when the received voltage value of the power receiving device 150 is similar to or slightly smaller than the supplied voltage value of the power feeding device 140, it is considered that the state of the cable 130 is good. In this case, the determination unit 146 determines that the power feeding by the power feeding device 140 should be allowed.

The power feeding device 140 controls the power supply to the power receiving device 120 in accordance with the result of the determination in the controller 142 (Step S127). Specifically, when the result of the determination in the determination unit 146 indicates that the power feeding should be allowed, the controller 142 continues the power feeding from the power feeding device 140 to the power receiving device 150. On the other hand, when the result of the determination in the determination unit 146 indicates that the power feeding should be rejected, the controller 142 stops the power feeding from the power feeding device 140 to the power receiving device 150. When, for example, the result of the determination indicates that the power feeding should be rejected, the controller 142 outputs the control signal for instructing the stop of the power feeding to the power supply output controller 118. When the control signal for instructing the stop of the power feeding is supplied, the power supply output controller 118 stops the power supply to the power supply line 131.

In this case, the controller 142 may reduce the voltage to be supplied from the power feeding device 140 to the power receiving device 150 instead of stopping the power feeding from the power feeding device 140 to the power receiving device 150. In this case, the controller 142 outputs the control signal for reducing the power feeding voltage to the power supply output controller 118. When the control signal for reducing the power feeding voltage is supplied, the power supply output controller 118 reduces the voltage to be supplied to the power supply line 131.

In the aforementioned example, the case in which the voltage value of the power feeding device 140 is measured using the voltage information acquisition unit 114 of the power feeding device 140 and the voltage value that has been measured is used as the supplied voltage information of the power feeding device 140 has been described. However, in this embodiment, the voltage value determined by the negotiation process performed between the power feeding device 140 and the power receiving device 150 may be used as the supplied voltage information of the power feeding device 140. In this case, the voltage information acquisition unit 114 of the power feeding device 140 can be omitted.

Further, in this embodiment, the result of the determination in the determination unit 146 may be transmitted to the power receiving device 150 and the power supply from the power feeding device 140 may be interrupted in the power receiving device 150. That is, when the result of the determination indicates that the power feeding should be rejected, the controller 152 of the power receiving device 150 may interrupt the power supplied from the power feeding device 140 in the power supply circuit 128.

In the power feeding system 5 according to this embodiment, the power receiving device 150 transmits the voltage value of the power supply line 131 acquired by the voltage information acquisition unit 124 to the power feeding device 140 as the information to be used for the determination regarding whether to allow the power feeding (Step S123). Then the power feeding device 140 determines whether to allow the power feeding (Step S126). When the result of the determination indicates that the power feeding should be rejected, the power feeding device 140 stops feeding power to the power receiving device 150 (or reduces the power feeding voltage) (Step S127). In this way, in the power feeding system according to this embodiment, the power feeding is stopped on the side of the power feeding device 140. Therefore, even when the cable has a fault, it is possible to prevent the faulty part of the cable from being heated or shorted out. It is therefore possible to provide the power feeding system and the negotiation controller capable of improving the safety level.

Sixth Embodiment

Figure 9:
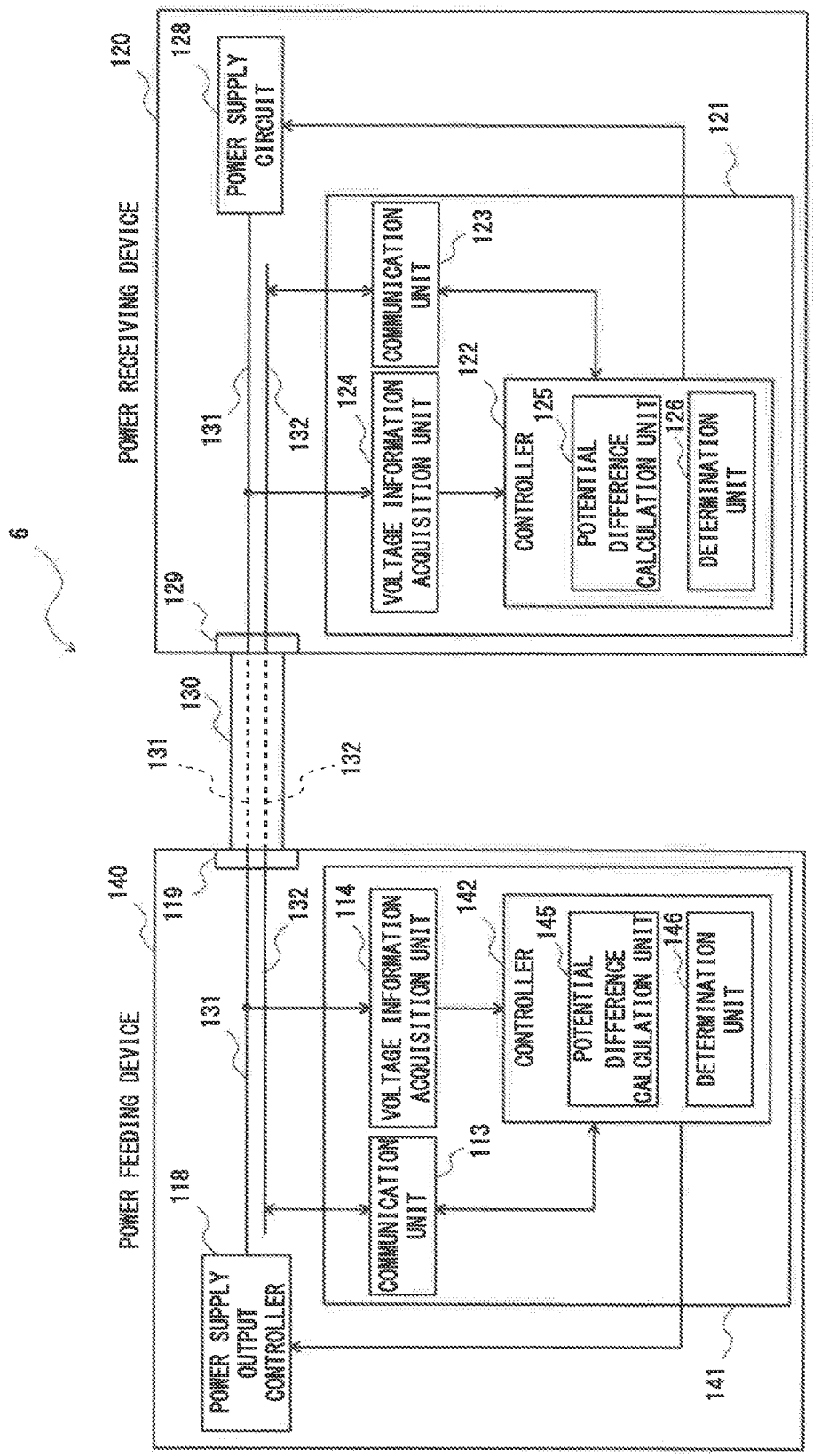
FIG. 9 is a block diagram showing a power feeding system according to a sixth embodiment.

Next, a sixth embodiment will be described. FIG. 9 is a block diagram showing a power feeding system according to the sixth embodiment. A power feeding system 6 according to this embodiment is different from the power feeding systems 4 and 5 described in the fourth and fifth embodiments in that both the power feeding device 140 and the power receiving device 120 perform the determination regarding whether to allow the power feeding by the power feeding device 140. Since the other configurations are similar to those of the power feeding systems 4 and 5 according to the fourth and fifth embodiments, the same components are denoted by the same reference symbols and overlapping descriptions thereof will be omitted as appropriate.

As shown in FIG. 9, the power feeding system 6 according to this embodiment includes a power feeding device 140 and a power receiving device 120. Since the configuration of the power receiving device 120 is similar to the power receiving device 120 included in the power feeding system 4 described in the fourth embodiment (see FIG. 5), overlapping descriptions thereof will be omitted. Further, since the configuration of the power feeding device 140 is similar to the power feeding device 140 included in the power feeding system 5 described in the fifth embodiment (see FIG. 7), overlapping descriptions thereof will be omitted.

Next, operations of the power feeding system 6 according to this embodiment will be described.

Figure 10:
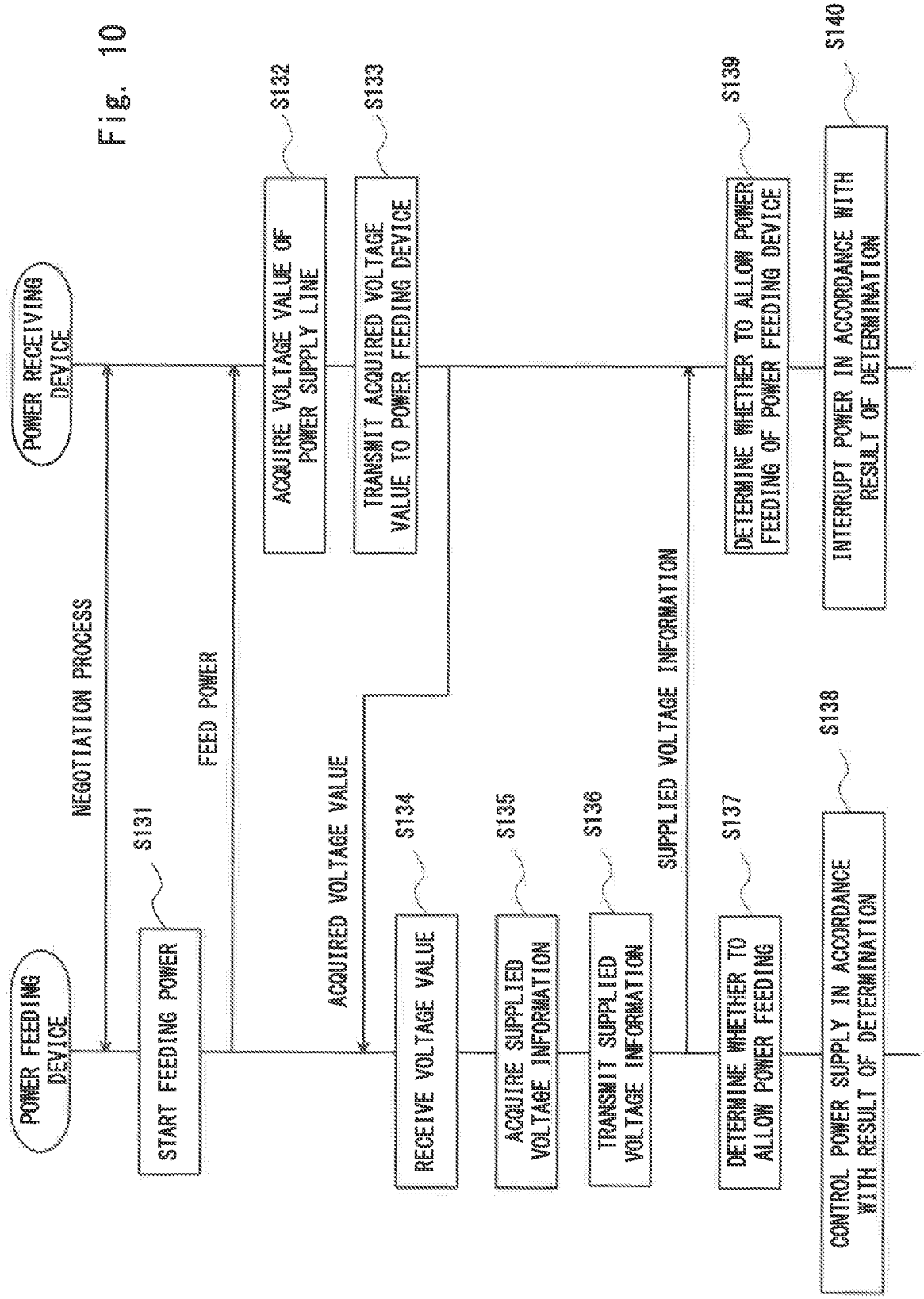
FIG. 10 is a flowchart showing operations of the power feeding system according to the sixth embodiment.

FIG. 10 is a flowchart showing operations of the power feeding system according to this embodiment. In the power feeding system 6 according to this embodiment, when the power feeding device 140 and the power receiving device 120 are connected to each other via the cable 130, the power feeding operation is started. When the power feeding operation is started, the power feeding device 140 and the power receiving device 120 communicate with each other to execute the operation of determining the power (voltage) that the power feeding device 140 supplies to the power receiving device 120 (negotiation process). The negotiation process is similar to that described in the fourth embodiment.

After the negotiation process is completed, the power feeding device 140 starts feeding power to the power receiving device 120 (Step S131). Specifically, the controller 142 of the power feeding device 140 outputs a control signal for supplying the power (voltage) to be supplied determined in the negotiation process described above to the power supply output controller 118. The power supply output controller 118 supplies power in accordance with the control signal output from the controller 142 to the power receiving device 120 via the power supply line 131.

Next, the voltage information acquisition unit 124 of the power receiving device 120 measures the voltage value of the power supply line 131 of the power receiving device 120 and outputs the voltage value that has been measured to the controller 122 (Step S132). The voltage value measured in the voltage information acquisition unit 124 corresponds to the information to be used for the determination regarding whether to allow the power feeding by the power feeding device 140.

The controller 122 of the power receiving device 120 transmits the voltage value acquired by the voltage information acquisition unit 124 to the power feeding device 140 (Step S133). Specifically, the controller 122 outputs the voltage value supplied from the voltage information acquisition unit 124 to the communication unit 123. The communication unit 123 transmits the voltage value output from the controller 122 to the power feeding device 140 via the communication line 132. The power feeding device 140 receives the voltage value transmitted from the power receiving device 120 using the communication unit 113 and outputs the voltage value that has been received to the controller 142 (Step S134).

Further, the voltage information acquisition unit 114 of the power feeding device 140 measures the voltage value of the power supply line 131 of the power feeding device 140 and outputs the voltage value that has been measured to the controller 142 (Step S135). The controller 142 transmits the voltage value that has been measured to the power receiving device 120 via the communication unit 113 as the supplied voltage information of the power feeding device 140 (Step S136).

The controller 142 determines, using the voltage value measured in the voltage information acquisition unit 114 of the power feeding device 140 (hereinafter it will also be referred to as a supplied voltage value of the power feeding device 140) and the voltage value measured in the voltage information acquisition unit 124 of the power receiving device 120 (hereinafter it will also be referred to as a received voltage value of the power receiving device 120), whether to allow the power feeding by the power feeding device 140 (Step S137).

Specifically, the potential difference calculation unit 145 included in the controller 142 calculates the potential difference between the supplied voltage value of the power feeding device 140 and the received voltage value of the power receiving device 120. When the potential difference calculated in the potential difference calculation unit 145 is equal to or larger than a predetermined value, the determination unit 146 determines that the power feeding by the power feeding device 140 should be rejected. On the other hand, when the potential difference calculated in the potential difference calculation unit 145 is smaller than the predetermined value, the determination unit 146 determines that the power feeding should be allowed.

After that, the power feeding device 140 controls the power supply to the power receiving device 120 in accordance with the result of the determination in the controller 142 (Step S138). Specifically, when the result of the determination in the determination unit 146 indicates that the power feeding should be allowed, the controller 142 continues the power feeding from the power feeding device 140 to the power receiving device 120. On the other hand, when the result of the determination in the determination unit 146 indicates that the power feeding should be rejected, the controller 142 stops the power feeding from the power feeding device 140 to the power receiving device 120. When, for example, the result of the determination indicates that the power feeding should be rejected, the controller 142 outputs the control signal for instructing the stop of the power feeding to the power supply output controller 118. When the control signal for instructing the stop of the power feeding is supplied, the power supply output controller 118 stops the power supply to the power supply line 131.

At this time, the controller 142 may reduce the voltage to be supplied from the power feeding device 140 to the power receiving device 120 instead of stopping the power feeding from the power feeding device 140 to the power receiving device 120. In this case, the controller 142 outputs the control signal for reducing the power feeding voltage to the power supply output controller 118. When the control signal for reducing the power feeding voltage is supplied, the power supply output controller 118 reduces the voltage to be supplied to the power supply line 131.

Further, the controller 122 of the power receiving device 120 determines, using the voltage value measured in the voltage information acquisition unit 114 of the power feeding device 140 (supplied voltage value) and the voltage value measured in the voltage information acquisition unit 124 of the power receiving device 120 (received voltage value), whether to allow the power feeding by the power feeding device 140 (Step S139).

Specifically, the potential difference calculation unit 125 included in the controller 122 calculates the potential difference between the supplied voltage value of the power feeding device 140 and the received voltage value of the power receiving device 120. Then the determination unit 126 determines that the power feeding by the power feeding device 140 should be rejected when the potential difference calculated in the potential difference calculation unit 125 is equal to or larger than a predetermined value. On the other hand, the determination unit 126 determines that the power feeding should be allowed when the potential difference calculated in the potential difference calculation unit 125 is smaller than the predetermined value.

After that, the power receiving device 120 interrupts the power supply from the power feeding device 140 in accordance with the result of the determination in the controller 122 (Step S140). Specifically, the controller 122 interrupts the power supplied from the power feeding device 140 when the result of the determination indicates that the power feeding should be rejected. When, for example, the result of the determination indicates that the power feeding should be rejected, the controller 122 outputs the control signal for instructing the power interruption to the power supply circuit 128. When the control signal for instructing the power interruption is supplied, the power supply circuit 128 cuts the connection between the power supply line 131 and the internal circuit (not shown). On the other hand, when the result of the determination indicates that the power feeding should be allowed, the controller 122 continuously receives the power supplied from the power feeding device 140.

In the aforementioned example, the case in which the voltage value of the power feeding device 140 is measured using the voltage information acquisition unit 114 of the power feeding device 140 and the voltage value that has been measured is used as the supplied voltage information of the power feeding device 140 has been described. However, in this embodiment, the voltage value determined by the negotiation process performed between the power feeding device 140 and the power receiving device 150 may be used as the supplied voltage information of the power feeding device 140. In this case, the voltage information acquisition unit 114 of the power feeding device 140 can be omitted.

In the power feeding system according to this embodiment described above, the power receiving device 120 transmits the voltage value of the power supply line 131 acquired by the voltage information acquisition unit 124 to the power feeding device 140 as the information to be used for the determination regarding whether to allow the power feeding by the power feeding device 140 (Step S133). Then it is determined in the power feeding device 140 whether to allow the power feeding (Step S137). When the result of the determination indicates that the power feeding should be rejected, the power feeding device 140 stops feeding power to the power receiving device 120 (or reduces the power feeding voltage) (Step S138). In this way, in the power feeding system according to this embodiment, the power feeding device 140 stops the power feeding. Therefore, even when the cable has a fault, it is possible to prevent the faulty part of the cable from being heated or shorted out. It is therefore possible to provide the power feeding system and the negotiation controller capable of improving the safety level.

In the power feeding system according to this embodiment, in particular, both of the power feeding device 140 and the power receiving device 120 perform the determination regarding whether to allow the power feeding by the power feeding device 140, whereby it is possible to perform the determination regarding whether to allow the power feeding more definitely. That is, even when an erroneous determination (to continue the power feeding) has been made in one of the power feeding device 140 and the power receiving device 120 when the power feeding should be stopped, the other one of them makes a correct determination (to stop the power feeding), whereby it is possible to secure the security performance of the power feeding system.

Seventh Embodiment

Figure 11:
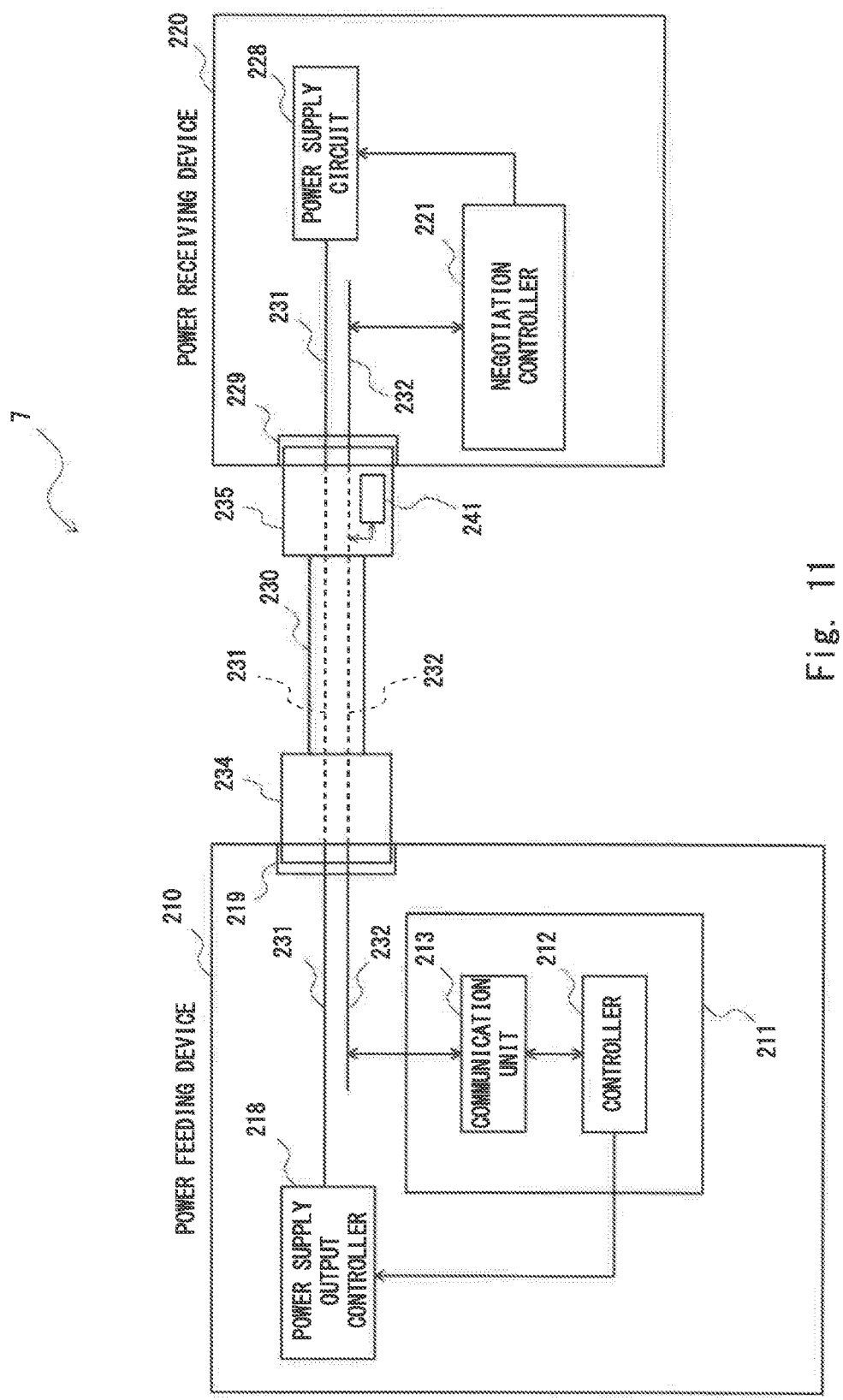
FIG. 11 is a block diagram showing a power feeding system according to a seventh embodiment.

Next, a seventh embodiment will be described. FIG. 11 is a block diagram showing a power feeding system according to the seventh embodiment. The power feeding system according to this embodiment is different from the power feeding systems described above in that a cable 230 includes a negotiation controller 241. Since the other basic configurations are similar to those in the embodiments described above, overlapping descriptions thereof will be omitted as appropriate.

As shown in FIG. 11, a power feeding system 7 according to this embodiment includes a power feeding device 210, a power receiving device 220, and a cable 230. The power feeding device 210 includes a negotiation controller 211, a power supply output controller 218, and a connector 219. The negotiation controller 211 includes a controller 212 and a communication unit 213. The power receiving device 220 includes a negotiation controller 221, a power supply circuit 228, and a connector 229.

The power feeding device 210 and the power receiving device 220 are connected to each other via the cable 230. The cable 230 includes a power supply line 231 and a communication line 232. Further, connectors 234 and 235 are provided in the respective ends of the cable. While the connector 234 is provided in the power feeding system according to this embodiment, it may not be provided in a power feeding device integrated with the cable.

The connector 234 of the cable 230 is connected to the connector 219 of the power feeding device 210. The connector 235 of the cable 230 is connected to the connector 229 of the power receiving device 220. Accordingly, the power feeding device 210 is able to supply power to the power receiving device 220 via the power supply line 231. Further, the power feeding device 210 and the power receiving device 220 are able to communicate with each other via the communication line 232. Further, the negotiation controller 241 is provided in the connector 235 of the cable 230.

The power feeding device 210 and the power receiving device 220 are embedded in, for example, an information device such as a computer or a peripheral device and the power feeding device 210 and the power receiving device 220 are connected to each other using the cable 230, whereby the information communication and the power supply between the devices can be concurrently performed. The information communication between the devices is performed using the communication line 232 included in the cable 230 and the power supply between the devices is performed using the power supply line 231 included in the cable 230.

The power feeding device 210 and the power receiving device 220 are, for example, devices that are equipped with USB terminals. In this case, the connector 219 and the connector 229 are USB connectors and the cable 230 is a USB cable. USB Power Delivery standards define, for example, that power between 5 V-20 V (up to 100 W) can be supplied. The power feeding device 210 may be an AC adapter.

The negotiation controller 211 included in the power feeding device 210 includes the controller 212 and the communication unit 213. The communication unit 213 is configured to be able to communicate with the negotiation controller 241 included in the cable 230 and the negotiation controller 221 included in the power receiving device 220 via the communication line 232. The controller 212 communicates with the negotiation controller 241 included in the cable 230 and the negotiation controller 221 included in the power receiving device 220 and determines the power (voltage) to be supplied to the power receiving device 220. The controller 212 determines, for example, the power (voltage) to be supplied to the power receiving device 220 based on the power (voltage) requested from the negotiation controller 221 included in the power receiving device 220. Further, the controller 212 outputs a control signal for controlling the power that the power feeding device 210 supplies to the power receiving device 220 to the power supply output controller 218.

The power supply output controller 218 controls the power that the power feeding device 210 supplies to the power receiving device 220 in accordance with the control signal output from the controller 212. The power supply output controller 218 includes, for example, a power supply circuit (not shown) and the power supply output controller 218 changes, in accordance with the control signal output from the controller 212, the voltage supplied from the power supply circuit (not shown) to supply the resulting voltage to the power supply line 231. According to the aforementioned configuration, the power supply output controller 218 is able to supply power of a different voltage to the power supply line 231. Further, the power supply output controller 218 stops the power supply to the power supply line 231 when the control signal output from the controller 212 is a control signal for instructing stop of the power feeding.

The negotiation controller 221 included in the power receiving device 220 communicates with the negotiation controller 211 included in the power feeding device 210 and determines the power (voltage) to be supplied from the power feeding device 210. Further, the negotiation controller 221 outputs a control signal for controlling the power supply circuit 228 to the power supply circuit 228.

The power supply circuit 228 controls, in accordance with the control signal output from the negotiation controller 221, the state of the power feeding from the power feeding device 210. An internal circuit (not shown) is connected to the output stage of the power supply circuit 228 and the power supply circuit 228 controls the supply of the power to the internal circuit in accordance with the control signal output from the negotiation controller 221. When, for example, the control signal output from the negotiation controller 221 is a control signal indicating that the supply of the power to the internal circuit should be interrupted, the power supply circuit 228 cuts the connection between the power supply line 231 and the internal circuit.

Figure 12:
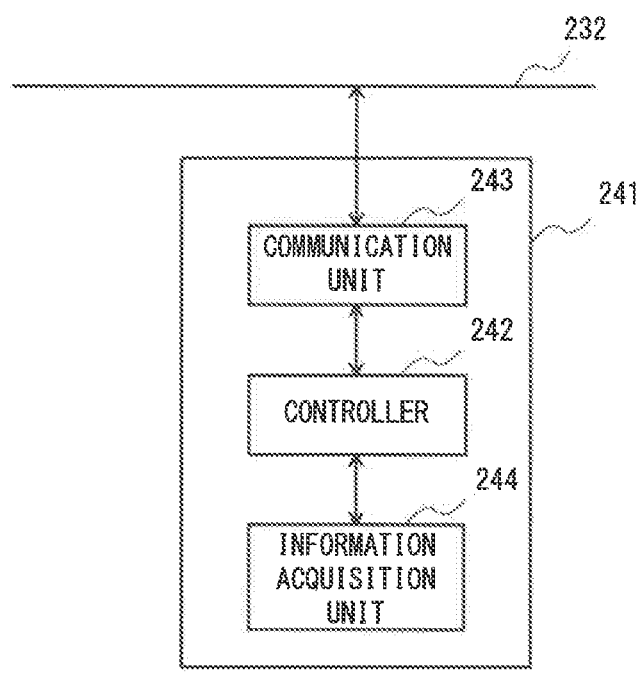
FIG. 12 is a block diagram showing a negotiation controller including a cable shown in FIG. 11.

Next, the negotiation controller 241 included in the cable 230 will be described. FIG. 12 is a block diagram for describing the negotiation controller 241 included in the cable 230. As shown in FIG. 12, the negotiation controller 241 includes a controller 242, a communication unit 243, and an information acquisition unit 244. The communication unit 243 is configured to be able to communicate with the negotiation controller 211 included in the power feeding device 210 via the communication line 232.

The information acquisition unit 244 acquires the information to be used for the determination regarding whether to allow the power feeding by the power feeding device 210. The information to be used for the determination regarding whether to allow the power feeding includes, for example, the voltage value of the power supply line 231 measured in the cable 230 (the connector 235), the number of times of insertion and removal of the connector 235 included in the cable 230, the temperature at a predetermined location on the cable 230 and the like. The information acquisition unit 244 may acquire the information to be used for the determination regarding whether to allow the power feeding from, for example, a sensor or the like provided outside the negotiation controller 241. These are merely examples and the power feeding system 7 according to this embodiment may use other information as the information to be used for the determination regarding whether to allow the power feeding.

When, for example, the voltage value of the power supply line 231 of the cable 230 is used as the information to be used for the determination regarding whether to allow the power feeding, the information acquisition unit 244 measures the voltage of the power supply line 231. In this case, a voltage information acquisition unit is included as the information acquisition unit 244 (see the fourth embodiment).

Further, when the number of times of insertion and removal of the connector 235 included in the cable 230 is used as the information to be used for the determination regarding whether to allow the power feeding, the negotiation controller 241 detects the insertion and the removal of the connector 235 and counts the number of times of insertion and removal of the connector 235.

Further, when the temperature at a predetermined location on the cable 230 is used as the information to be used for the determination regarding whether to allow the power feeding, a temperature sensor is provided at the predetermined location on the cable 230 and the temperature is measured using this temperature sensor. The temperature sensor is preferably provided, for example, in the vicinity of the connector 234 or 235 or in the vicinity of the power supply line 231 of the cable 230. By providing the temperature sensor in the vicinity of the connector 234 or 235, it is possible to detect a temperature increase due to a faulty connection of the connector 234 or 235 or a temperature increase due to a faulty conduction of the cable 230. Further, by providing the temperature sensor in the vicinity of the power supply line 231 of the cable 230, it is possible to detect a temperature increase due to a failure in the power supply line 231 and a temperature increase due to overvoltage supply.

Next, operations of the power feeding system 1 according to this embodiment will be described.

Figure 13:
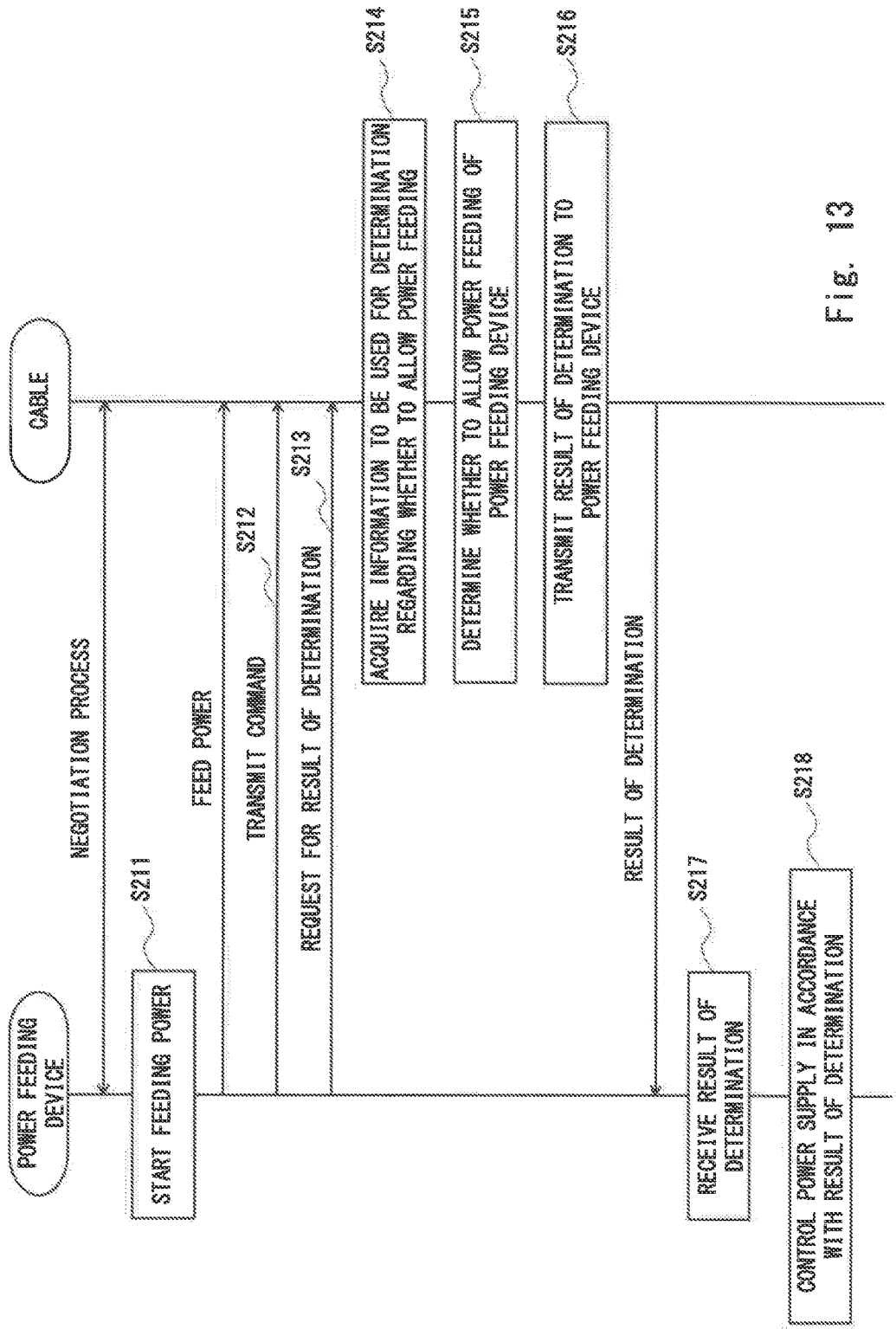
FIG. 13 is a flowchart showing operations of the power feeding system according to the seventh embodiment.

FIG. 13 is a flowchart showing operations of the power feeding system according to this embodiment. FIG. 13 specifically shows operations between the power feeding device 210 and the cable 230. In the power feeding system 7 according to this embodiment, when the power feeding device 210 and the power receiving device 220 are connected to each other via the cable 230, the power feeding operation is started. When the power feeding operation is started, the power feeding device 210 and the power receiving device 220 communicate with each other to execute the operation of determining the power (voltage) that the power feeding device 210 supplies to the power receiving device 220 (negotiation process).

Specifically, the negotiation controller 221 included in the power receiving device 220 transmits information indicating the power required by the power receiving device 220 to the negotiation controller 211 included in the power feeding device 210. Further, the negotiation controller 211 included in the power feeding device 210 transmits information regarding power that the power feeding device 210 can supply to the negotiation controller 221 included in the power receiving device 220. When the power receiving device 220 and the power feeding device 210 have agreed on the power to be supplied, the negotiation process is ended. On the other hand, when the power receiving device 220 and the power feeding device 210 have not agreed on the power to be supplied, the negotiation controller 221 included in the power receiving device 220 transmits information indicating power lower than the power that it has presented last time to the negotiation controller 211 included in the power feeding device 210. This operation is repeated until the power receiving device 220 and the power feeding device 210 agree on the power to be supplied. According to this process, the power (voltage) that the power feeding device 210 supplies to the power receiving device 220 is determined.

Further, in this embodiment, the negotiation controller 211 included in the power feeding device 210 executes the negotiation process with the negotiation controller 241 included in the cable 230 as well. Specifically, the negotiation controller 211 included in the power feeding device 210 acquires information regarding the cable 230 from the negotiation controller 241 included in the cable 230. The information regarding the cable 230 includes, for example, information such as the rated voltage, the rated current, the manufacturer, and the type of the cable 230. The power feeding device 210 may determine the voltage to be supplied to the power receiving device 220 in consideration of the information regarding the cable 230 (e.g., the rated voltage, the rated current) as well.

After the negotiation process between the power receiving device 220 and the cable 230 is completed, the power feeding device 210 starts feeding power to the power receiving device 220 (Step S211). Specifically, the controller 212 of the power feeding device 210 outputs a control signal for supplying the power (voltage) to be supplied determined in the negotiation process described above to the power supply output controller 218. The power supply output controller 218 supplies the power in accordance with the control signal output from the controller 212 to the power receiving device 220 via the power supply line 231.

Next, the power feeding device 210 transmits a predetermined command to the negotiation controller 241 of the cable 230 (Step S212).

After that, the power feeding device 210 transmits a determination result request signal to the negotiation controller 241 of the cable 230 (Step S213). The determination result is the result of the determination regarding whether to allow the power feeding by the power feeding device 210 determined in the negotiation controller 241 of the cable 230.

Upon receiving the determination result request signal, the information acquisition unit 244 (see FIG. 12) of the negotiation controller 241 of the cable 230 acquires the information to be used for the determination regarding whether to allow the power feeding by the power feeding device 210 (Step S214). The acquired information is supplied to the controller 242 (see FIG. 12). The information to be used for the determination regarding whether to allow the power feeding includes, for example, the voltage value of the power supply line 231 measured in the cable 230, the number of times of insertion and removal of the connector 234 or 235 included in the cable 230, the temperature at the predetermined location on the cable 230 and the like. These are merely examples and the power feeding system 7 according to this embodiment may use other information as the information to be used for the determination regarding whether to allow the power feeding.

Next, the controller 242 of the negotiation controller 241 determines whether to allow the power feeding by the power feeding device 210 using the information to be used for the determination regarding whether to allow the power feeding (Step S215). In this case, the controller 242 of the negotiation controller 241 serves as a determination unit.

When, for example, the information to be used for the determination regarding whether to allow the power feeding is the voltage value of the power supply line 231 measured in the cable 230, the controller 242 determines that the power feeding by the power feeding device 210 should be rejected when the difference between the voltage value that the power feeding device 210 supplies to the power receiving device 220 and the voltage value of the power supply line 231 measured in the cable 230 is equal to or larger than a predetermined value. In this case, it can be considered that the voltage value in the cable 230 has been reduced due to a reason such as a failure (e.g., a damage) in the cable 230. The voltage value that the power feeding device 210 supplies to the power receiving device 220 has already been acquired by the controller 242 in the negotiation process.

Further, when, for example, the information to be used for the determination regarding whether to allow the power feeding is the number of times of insertion and removal of the connector 234 or 235 included in the cable 230, the controller 242 determines that the power feeding from the power feeding device 210 should be rejected in a case in which the number of times of insertion and removal is equal to or larger than a predetermined value. When the number of times of insertion and removal of the connector 234 or 235 is equal to or larger than the predetermined value, it is possible that a failure (e.g., a damage) may occur in the connector 234 or 235 or the cable 230. In this case, the controller 242 determines that the power feeding from the power feeding device 210 should be rejected.

Further, when, for example, the information to be used for the determination regarding whether to allow the power feeding is the temperature at the predetermined location on the cable 230, the controller 242 determines that the power feeding from the power feeding device 10 should be rejected in a case in which this temperature is equal to or larger than a predetermined temperature. When the temperature of the cable 230 is equal to or larger than the predetermined temperature, there is a possibility that the cable 230 has a failure (e.g., a damage). In this case, the controller 242 determines that the power feeding from the power feeding device 210 should be rejected.

Next, the negotiation controller 241 of the cable 230 transmits the result of the determination regarding whether to allow the power feeding to the power feeding device 210 (Step S216). Specifically, the controller 242 of the negotiation controller 241 shown in FIG. 12 outputs the result of the determination to the communication unit 243. The communication unit 243 transmits the result of the determination output from the controller 242 to the power feeding device 210 via the communication line 232.

The power feeding device 210 receives the result of the determination (Step S217) and controls the power supply to the power receiving device 220 in accordance with the result of the determination that has been received (Step S218). Specifically, the communication unit 213 of the power feeding device 210 receives the result of the determination transmitted from the negotiation controller 241 of the cable 230 and outputs the result of the determination that has been received to the controller 212. When the result of the determination indicates that the power feeding should be allowed, the controller 212 continues the power feeding from the power feeding device 210 to the power receiving device 220. On the other hand, when the result of the determination indicates the power feeding should be rejected, the controller 212 stops the power feeding from the power feeding device 210 to the power receiving device 220. When the result of the determination indicates the power feeding should be rejected, the controller 212 outputs, for example, a control signal for instructing the stop of the power feeding to the power supply output controller 218. When the control signal for instructing the stop of the power feeding is supplied, the power supply output controller 218 stops the power supply to the power supply line 231.

In this case, the controller 212 may reduce the voltage to be supplied from the power feeding device 210 to the power receiving device 220 instead of stopping the power feeding from the power feeding device 210 to the power receiving device 220. In this case, the controller 212 outputs the control signal for reducing the power feeding voltage to the power supply output controller 218. When the control signal for reducing the power feeding voltage is supplied, the power supply output controller 218 reduces the voltage to be supplied to the power supply line 231.

In this embodiment as well, when the result of the determination indicates that the power feeding should be rejected, the power receiving device 220 may interrupt the power supplied from the power feeding device 210.

FIG. 14 is a flowchart showing another example of the operations of the power feeding system according to this embodiment. In the operations of the power feeding system shown in FIG. 13, when the determination result request signal is transmitted from the power feeding device 210 (Step S213), the negotiation controller 241 of the cable 230 determines, in response to this signal, whether to allow the power feeding (Step S215), and the result of the determination is transmitted to the power feeding device 210 (Step S216). This determination result request signal is transmitted from the power feeding device 210 at predetermined intervals and the negotiation controller 241 of the cable 230 transmits, in response to this signal, the result of the determination to the power feeding device 210 each time the signal is transmitted.

On the other hand, in the operation of the power feeding system shown in FIG. 14, when the determination result request signal is transmitted from the power feeding device 210 (Step S223), the result of the determination is transmitted to the power feeding device 210 only when the negotiation controller 241 of the cable 230 has detected an abnormality after the transmission of the signal. In the following description, operations of the power feeding system shown in FIG. 14 will be described.

As shown in the flowchart in FIG. 14, after the negotiation process between the power receiving device 220 and the cable 230 is completed, the power feeding device 210 starts feeding power to the power receiving device 220 (Step S221). Next, the power feeding device 210 transmits a predetermined command to the negotiation controller 241 of the cable 230 (Step S222). After that, the power feeding device 210 transmits the determination result request signal to the negotiation controller 241 of the cable 230 (Step S223). The operations of Steps S221-S223 shown in FIG. 14 are similar to the operations of Steps S211-S213 shown in FIG. 13.

In the operation of the power feeding system shown in FIG. 14, when the determination result request signal is transmitted from the power feeding device 210 (Step S223), the result of the determination is transmitted to the power feeding device 210 only when the negotiation controller 241 of the cable 230 has detected an abnormality after the transmission of the signal. That is, the information acquisition unit 244 (see FIG. 12) of the negotiation controller 241 of the cable 230 acquires the information to be used for the determination regarding whether to allow the power feeding from the power feeding device 210 (Step S224). After that, the controller 242 of the negotiation controller 241 determines whether to allow the power feeding using the information to be used for the determination regarding whether to allow the power feeding (Step S225). In this case, the controller 242 of the negotiation controller 241 serves as a determination unit. The operation of the determination regarding whether to allow the power feeding (Step S225) shown in FIG. 14 is basically similar to the operation of the determination regarding whether to allow the power feeding (Step S215) shown in FIG. 13.

When the result of the determination indicates that the power feeding should be allowed, that is, when the negotiation controller 241 of the cable 230 has not detected an abnormality (Step S226: No), the negotiation controller 241 regularly repeats the operations of Steps S224-S226. On the other hand, when the result of the determination indicates power feeding should be rejected, that is, when the negotiation controller 241 of the cable 230 has detected an abnormality (Step S226: Yes), the negotiation controller 241 transmits an abnormality determination to the power feeding device 210 (Step S227).

When the power feeding device 210 receives the abnormality determination transmitted from the negotiation controller 241 of the cable 230 (Step S228), the power feeding device 210 stops the power supply from the power feeding device 210 to the power receiving device 220 (Step S229).

After the power supply from the power feeding device 210 to the power receiving device 220 is stopped, when, for example, the temperature of the cable 230 has been reduced, when the connector 234 or 235 of the cable 230 has been removed, when the user has sent an instruction (when the user has pressed a reset button), or when the power feeding device 210 is powered up again, the power feeding device 210 may be recovered and the normal operation may be started.

According to these operations, it is possible to provide the power feeding system capable of improving the security performance.

In the power feeding system according to the seventh embodiment, the case in which the negotiation controller 241 of the cable 230 executes the determination regarding whether to allow the power feeding by the power feeding device 210 has been described. However, in this embodiment, the information to be used for the determination regarding whether to allow the power feeding acquired in the negotiation controller 241 of the cable 230 may be transmitted to the negotiation controller of the power feeding device and the determination regarding whether to allow the power feeding may be performed in the negotiation controller (the determination unit) of the power feeding device. Since the configuration in which the negotiation controller (the determination unit) included in the power feeding device performs the determination regarding whether to allow the power feeding is similar to that of the cases described in the fifth and sixth embodiments, overlapping descriptions thereof will be omitted.

Further, in the power feeding system according to the seventh embodiment, the negotiation controller may be provided in each of the connectors 234 and 235 provided in the respective ends of the cable 230. In this case, a signal for identifying the connector 235 which is far from the power feeding device 210 is input to the power feeding device 210, whereby the power feeding device 210 is able to identify the negotiation controller 241 which is on the side of the connector 235 of the cable 230.

Further, in the power feeding system according to the seventh embodiment, the negotiation controller 241 of the cable 230 may be constituted, for example, using an integrated circuit (semiconductor chip). In this case, in the power feeding system according to the seventh embodiment, an integrated circuit (semiconductor chip) that constitutes the negotiation controller 241 of the cable 230 may be constituted using a chip the same as the integrated circuit (semiconductor chip) that constitutes the negotiation controller 21 included in the power receiving device 20 described in the first embodiment. Alternatively, an integrated circuit (semiconductor chip) dedicated for the negotiation controller 241 of the cable 230 may be used.

Further, in the power feeding systems according to the first to seventh embodiments described above, the configuration in which each of the power feeding device and the power receiving device is included has been described. However, each of the power feeding systems may include a power receiving/feeding device including both of the power feeding function and the power receiving function. When the power feeding system is configured using the power receiving/feeding device, each of the power receiving/feeding device that performs the power feeding and the power receiving/feeding device that performs power receiving is determined in the negotiation process.

Further, in the power feeding systems described in the first to seventh embodiments, each of the power feeding device, the power receiving device, and the cable (in the seventh embodiment) performs packet communication.

Further, the power feeding systems according to the first to seventh embodiments may further include a broadcasting unit configured to notify the user of an abnormality when it is determined that the power feeding from the power feeding device to the power receiving device should be rejected. By providing the broadcasting unit, it is possible to notify the user that the cable has a fault (e.g., a damage). The broadcasting unit is able to notify the user of the abnormality by, for example, displaying a message on a display unit or emitting a warning sound. The broadcasting unit may be provided in both of the power feeding device and the power receiving device or may be provided only in one of the power feeding device and the power receiving device.

The first to seventh embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A power feeding system that supplies power from a power feeding device to a power receiving device via a cable, the power feeding system comprising:
   a first negotiation controller included in the power receiving device or the cable;
   a second negotiation controller included in the power feeding device; and
   a determination unit configured to determine whether to allow a power feeding from the power feeding device to the power receiving device,
   wherein the first negotiation controller comprises an information acquisition unit configured to acquire information to be used for the determination regarding whether to allow the power feeding,
   wherein the determination unit determines, using the information acquired in the information acquisition unit, whether to allow the power feeding from the power feeding device,
   wherein the second negotiation controller controls the power supply to the power receiving device in accordance with a result of the determination in the determination unit,
   wherein the information to be used for the determination regarding whether to allow the power feeding includes a voltage value of a power supply line included in the cable measured in the power receiving device or measured in the cable on a side connected to the power receiving device,
   wherein the first negotiation controller acquires information regarding a supplied voltage that the power feeding device supplies to the power receiving device from the power feeding device via the cable and measured in the power feeding device, and
   wherein the determination unit determines, when a difference between the voltage value of the power supply line measured in the power receiving device or measured in the cable on the side connected to the power receiving device and the supplied voltage measured in the power feeding device is equal to or larger than a predetermined value, that the power feeding from the power feeding device should be rejected.

2. A power feeding system that supplies power from a power feeding device to a power receiving device via a cable, the power feeding system comprising:
   a first negotiation controller included in the power receiving device or the cable;
   a second negotiation controller included in the power feeding device; and
   a determination unit configured to determine whether to allow g power feeding from the power feeding device to the power receiving device,
   wherein the first negotiation controller comprises an information acquisition unit configured to acquire information to be used for the determination regarding whether to allow the power feeding,
   wherein the determination unit determines, using the information acquired in the information acquisition unit, whether to allow the power feeding from the power feeding device,
   wherein the second negotiation controller controls the power supply to the power receiving device in accordance with a result of the determination in the determination unit,
   wherein the determination unit is provided in the power feeding device, and
   wherein the information to be used for the determination regarding whether to allow the power feeding includes a number of times of insertion and removal of a connector included in the power receiving device or a connector of the cable on a side connected to the power receiving device.

3. The power feeding system according to claim 2, wherein the determination unit determines, when the number of times of insertion and removal is equal to or larger than a predetermined value, that the power feeding from the power feeding device should be rejected.

4. A power feeding system that supplies power from a power feeding device to a power receiving device via a cable, the power feeding system comprising:
   a first negotiation controller included in the power receiving device or the cable;
   a second negotiation controller included in the power feeding device; and
   a determination unit configured to determine whether to allow a power feeding from the power feeding device to the power receiving device,
   wherein the first negotiation controller comprises an information acquisition unit configured to acquire information to be used for the determination regarding whether to allow the power feeding,
   wherein the determination unit determines, using the information acquired in the information acquisition unit, whether to allow the power feeding from the power feeding device,
   wherein the second negotiation controller controls the power supply to the power receiving device in accordance with a result of the determination in the determination unit,
   wherein the determination unit is provided in the power feeding device, and
   wherein the information to be used for the determination regarding whether to allow the power feeding includes a temperature at a predetermined location on the power receiving device or a temperature at a predetermined location on the cable.

5. The power feeding system according to claim 4, wherein the determination unit determines, when the temperature is equal to or larger than a predetermined temperature, that the power feeding from the power feeding device should be rejected.

6. A power feeding system that supplies power from a power feeding device to a power receiving device via a cable, the power feeding system comprising:
   a first negotiation controller included in the power receiving device or the cable;
   a second negotiation controller included in the power feeding device; and
   a determination unit configured to determine whether to allow a power feeding from the power feeding device to the power receiving device,
   wherein the first negotiation controller comprises an information acquisition unit configured to acquire information to be used for the determination regarding whether to allow the power feeding, wherein the determination unit determines, using the information acquired in the information acquisition unit, whether to allow the power feeding from the power feeding device, wherein the second negotiation controller controls the power supply to the power receiving device in accordance with a result of the determination in the determination unit, wherein the determination unit is provided in the power feeding device, and wherein, when it is determined in the determination unit that the power feeding from the power feeding device should be rejected, the second negotiation controller reduces a voltage of the power to be supplied to the power receiving device.

7. A power feeding system that supplies power from a power feeding device to a power receiving device via a cable, the power feeding system comprising:

a first negotiation controller included in the power receiving device or the cable;

a second negotiation controller included in the power feeding device; and a determination unit configured to determine whether to allow a power feeding from the power feeding device to the power receiving device, wherein the first negotiation controller comprises an information acquisition unit configured to acquire information to be used for the determination regarding whether to allow the power feeding, wherein the determination unit determines, using the information acquired in the information acquisition unit, whether to allow the power feeding from the power feeding device, wherein the second negotiation controller controls the power supply to the power receiving device in accordance with a result of the determination in the determination unit, wherein the determination unit is provided in the power feeding device, wherein the information to be used for the determination regarding whether to allow the power feeding includes a voltage value of a power supply line included in the cable measured in the power receiving device or measured in the cable on a side connected to the power receiving device, wherein the second negotiation controller acquires a voltage value of the power supply line measured in the power receiving device from the power feeding device via the cable, and wherein the determination unit provided in the power feeding device determines, when a difference between a supplied voltage that the power feeding device supplies to the power receiving device and the voltage value of the power supply line measured in the power receiving device is equal to or larger than a predetermined value, that the power feeding from the power feeding device should be rejected.

8. A power feeding system that supplies power from a power feeding device to a power receiving device via a cable, the power feeding system comprising:

a first negotiation controller included in the power receiving device or the cable;

a second negotiation controller included in the power feeding device; and a determination unit configured to determine whether to allow a power feeding from the power feeding device to the power receiving device, wherein the first negotiation controller comprises an information acquisition unit configured to acquire information to be used for the determination regarding whether to allow the power feeding, wherein the determination unit determines, using the information acquired in the information acquisition unit, whether to allow the power feeding from the power feeding device, wherein the second negotiation controller controls the power supply to the power receiving device in accordance with a result of the determination in the determination unit, wherein the determination unit is provided in the power feeding device, wherein the information to be used for the determination regarding whether to allow the power feeding includes a number of times of insertion and removal of a connector included in the power receiving device or a connector of the cable on a side connected to the power receiving device, wherein the second negotiation controller acquires the number of times of insertion and removal from the power receiving device via the cable, and wherein the determination unit provided in the power feeding device determines, when the number of times of insertion and removal is equal to or larger than a predetermined value, that the power feeding from the power feeding device should be rejected.

9. A power feeding system that supplies power from a power feeding device to a power receiving device via a cable, the power feeding system comprising:

a first negotiation controller included in the power receiving device or the cable;

a second negotiation controller included in the power feeding device; and a determination unit configured to determine whether to allow a power feeding from the power feeding device to the power receiving device, wherein the first negotiation controller comprises an information acquisition unit configured to acquire information to be used for the determination regarding whether to allow the power feeding, wherein the determination unit determines, using the information acquired in the information acquisition unit, whether to allow the power feeding from the power feeding device, wherein the second negotiation controller controls the power supply to the power receiving device in accordance with a result of the determination in the determination unit, wherein the determination unit is provided in the power feeding device, wherein the information to be used for the determination regarding whether to allow the power feeding includes a temperature at a predetermined location on the power receiving device or a temperature at a predetermined location on the cable, wherein the second negotiation controller acquires the temperature from the power receiving device via the cable, and wherein the determination unit provided in the power feeding device determines, when the temperature is equal to or larger than a predetermined temperature, that the power feeding from the power feeding device should be rejected.

10. The power feeding system according to claim 1, wherein the determination unit and the first negotiation controller are provided in a connector of the cable on the side connected to the power receiving device.

11. The power feeding system according to claim 1, wherein the first negotiation controller is included in the power receiving device.

12. The power feeding system according to claim 1, wherein the first negotiation controller is included in the cable.

13. The power feeding system according to claim 1, wherein the voltage value of the power supply line included in the cable is measured in the power receiving device.

14. The power feeding system according to claim 1, wherein the voltage value of the power supply line included in the cable is measured in the cable on the side connected to the power receiving device.

15. The power feeding system according to claim 1, wherein the determination unit determines, when the difference between the voltage value of the power supply line measured in the power receiving device and the supplied voltage measured in the power feeding device is equal to or larger than the predetermined value, that the power feeding from the power feeding device should be rejected.

16. The power feeding system according to claim 1, wherein the determination unit determines, when the difference between the voltage value of the power supply line measured in the cable on the side connected to the power receiving device and the supplied voltage measured in the power feeding device is equal to or larger than the predetermined value, that the power feeding from the power feeding device should be rejected.

* * * * *